(12) United States Patent
Koito

(10) Patent No.: US 11,579,499 B2
(45) Date of Patent: *Feb. 14, 2023

(54) ELECTRONIC APPARATUS

(71) Applicant: Japan Display Inc., Tokyo (JP)

(72) Inventor: Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,745

(22) Filed: Apr. 12, 2022

(65) Prior Publication Data

US 2022/0244589 A1 Aug. 4, 2022

Related U.S. Application Data

(63) Continuation of application No. 17/443,190, filed on Jul. 22, 2021, now Pat. No. 11,333,941, which is a
(Continued)

(30) Foreign Application Priority Data

Jan. 28, 2019 (JP) .............................. JP2019-012327

(51) Int. Cl.
*G02F 1/1339* (2006.01)
*G02F 1/1347* (2006.01)
(Continued)

(52) U.S. Cl.
CPC .......... *G02F 1/1347* (2013.01); *G02F 1/1339* (2013.01); *G02F 1/13306* (2013.01); *G02F 1/13439* (2013.01); *G02F 1/133514* (2013.01); *G02F 1/133531* (2021.01); *G02F 1/134309* (2013.01)

(58) Field of Classification Search
CPC ............... G02F 1/1347; G02F 1/13306; G02F 1/133514; G02F 1/133531; G02F 1/1339; G02F 1/134309; G02F 1/13439
See application file for complete search history.

(56) References Cited

U.S. PATENT DOCUMENTS 11,333,941 B2 * 5/2022 Koito ................ G02F 1/133531
2013/0050594 A1 2/2013 Hirayama et al.
(Continued)

FOREIGN PATENT DOCUMENTS

| JP | 2013-045087 A | 3/2013 |
| JP | 2014-197203 A | 10/2014 |
| JP | 2017-040908 A | 2/2017 |

*Primary Examiner* — James A Dudek
(74) *Attorney, Agent, or Firm* — Maier & Maier, PLLC

(57) ABSTRACT

According to one embodiment, an electronic apparatus includes a first liquid crystal panel, a second liquid crystal panel, a camera overlapping the first liquid crystal panel and the second liquid crystal panel and receiving light via the first liquid crystal panel and the second liquid crystal panel. The first liquid crystal panel includes a first liquid crystal layer, a first pixel electrode not overlapping the camera, and a second pixel electrode overlapping the camera. The second liquid crystal panel includes first transparent electrodes overlapping the camera, a second transparent electrode overlapping the first transparent electrodes, and a second liquid crystal layer disposed between the first transparent electrodes and the second transparent electrode.

8 Claims, 16 Drawing Sheets

Related U.S. Application Data continuation of application No. PCT/JP2019/045472, filed on Nov. 20, 2019.

(51) Int. Cl.
*G02F 1/1335* (2006.01)
*G02F 1/133* (2006.01)
*G02F 1/1343* (2006.01)

(56) References Cited

U.S. PATENT DOCUMENTS

| | | |
|---|---|---|
| 2013/0063676 A1 | 3/2013 | Tsuchihashi et al. |
| 2017/0053592 A1 | 2/2017 | Shin et al. |
| 2021/0223619 A1 | 7/2021 | Zhou |

\* cited by examiner

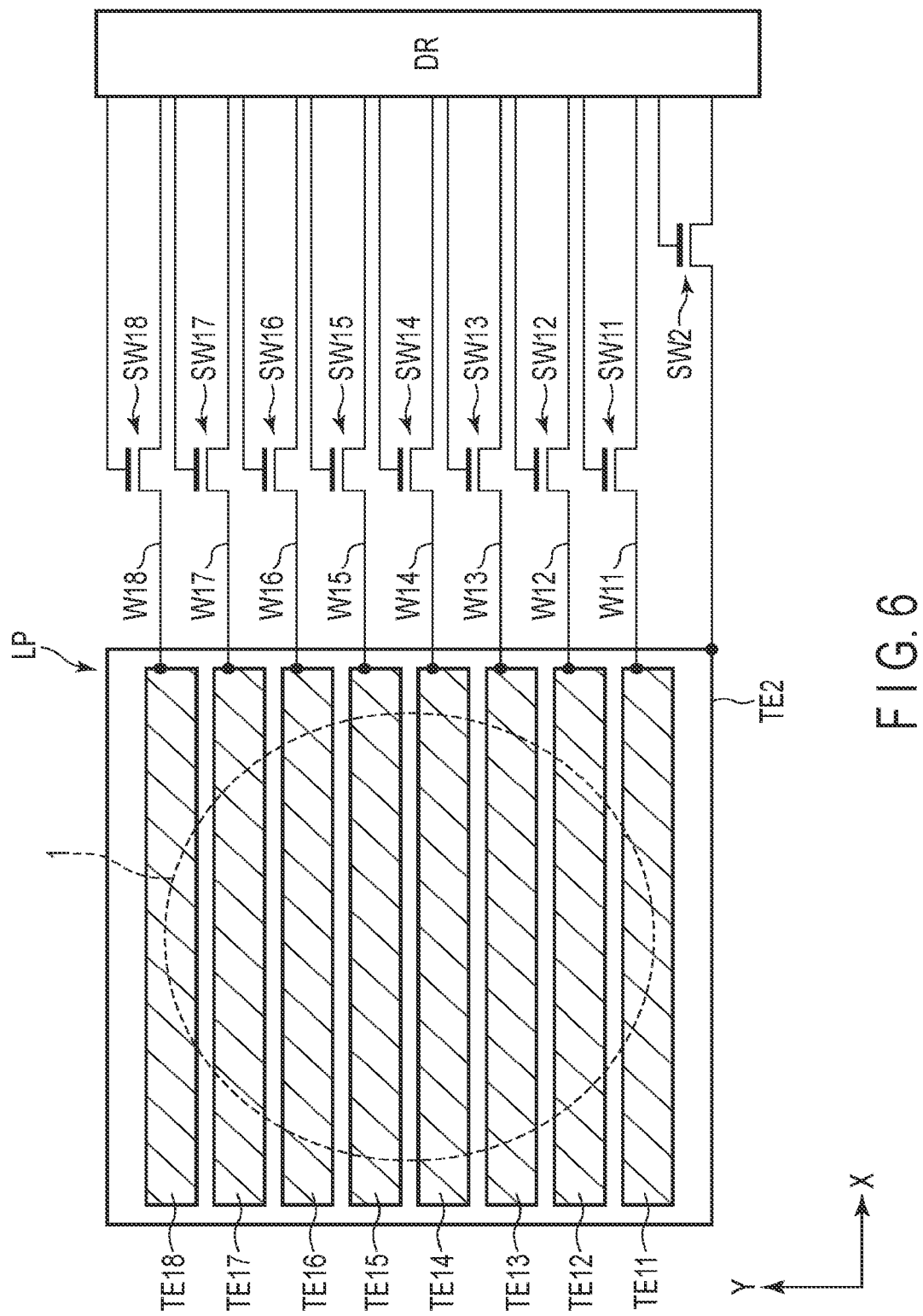
F I G. 6

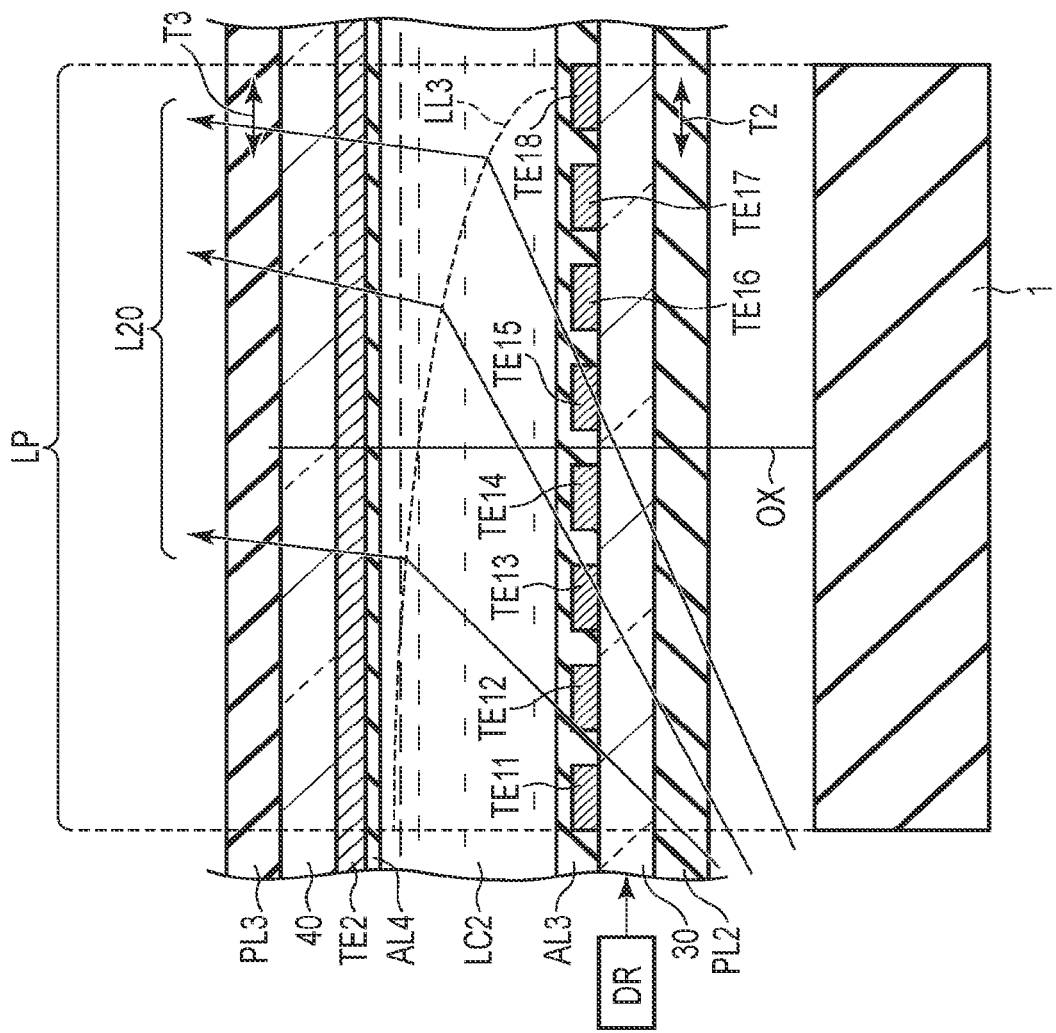
F I G. 11

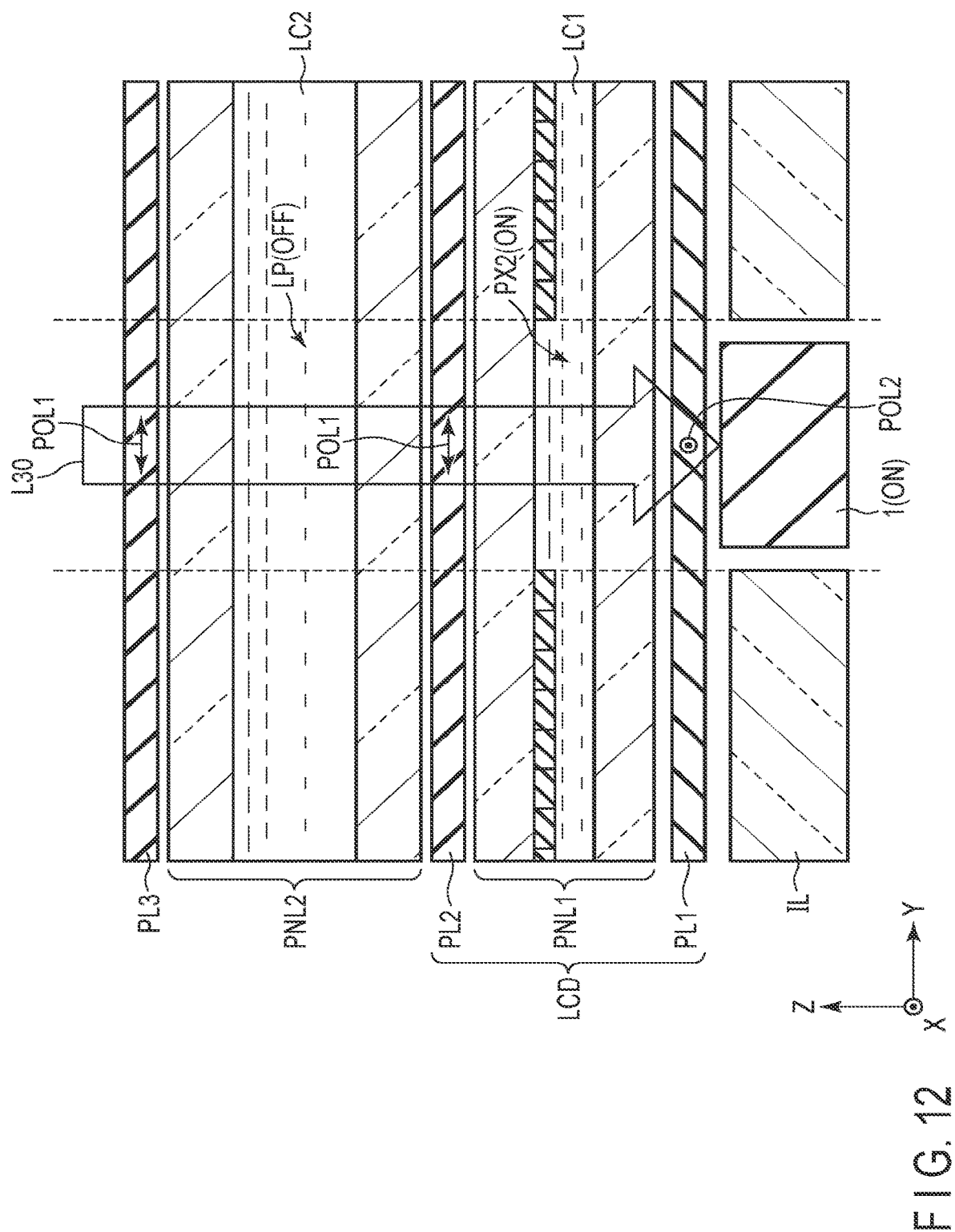
F I G. 12

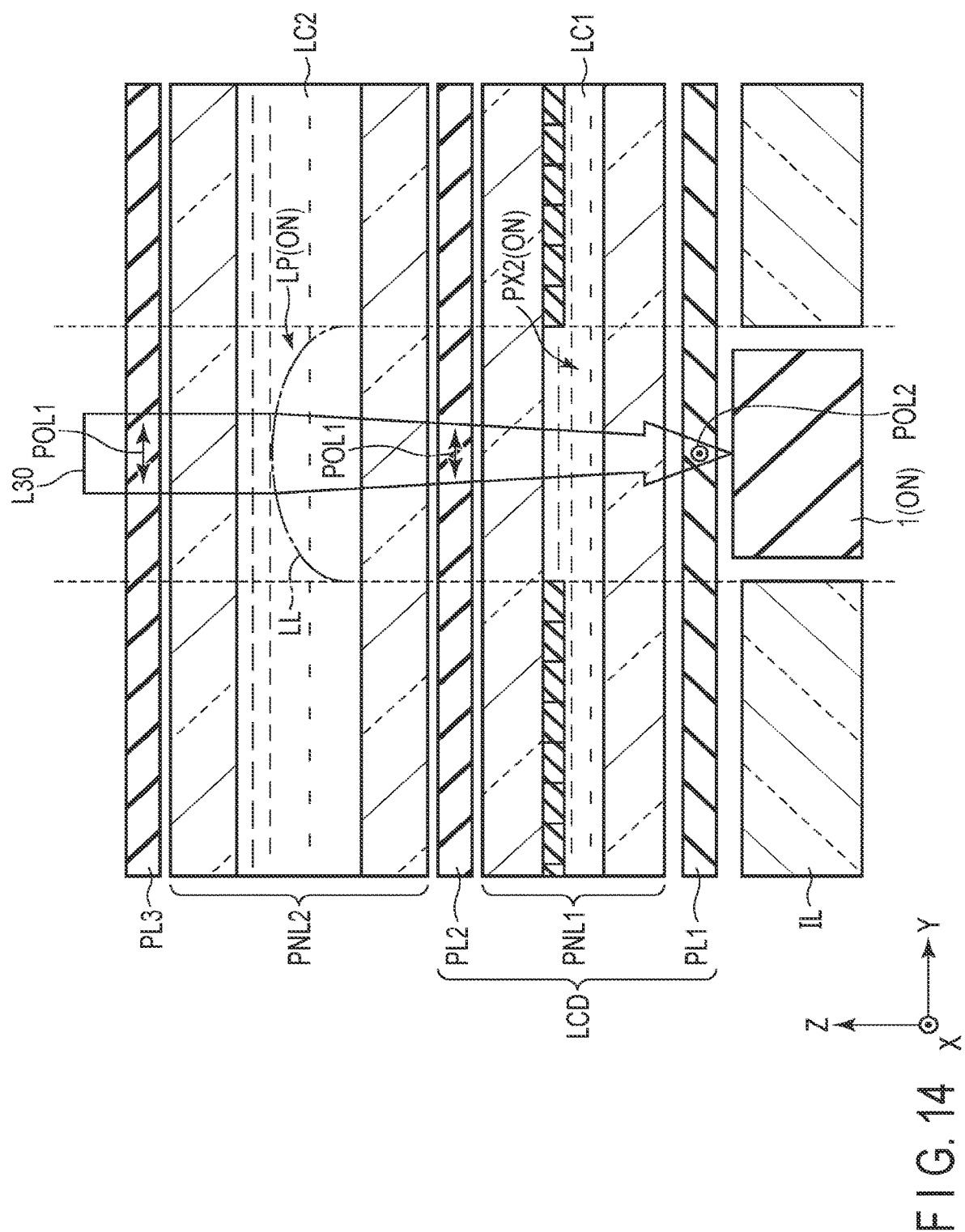
F I G. 14

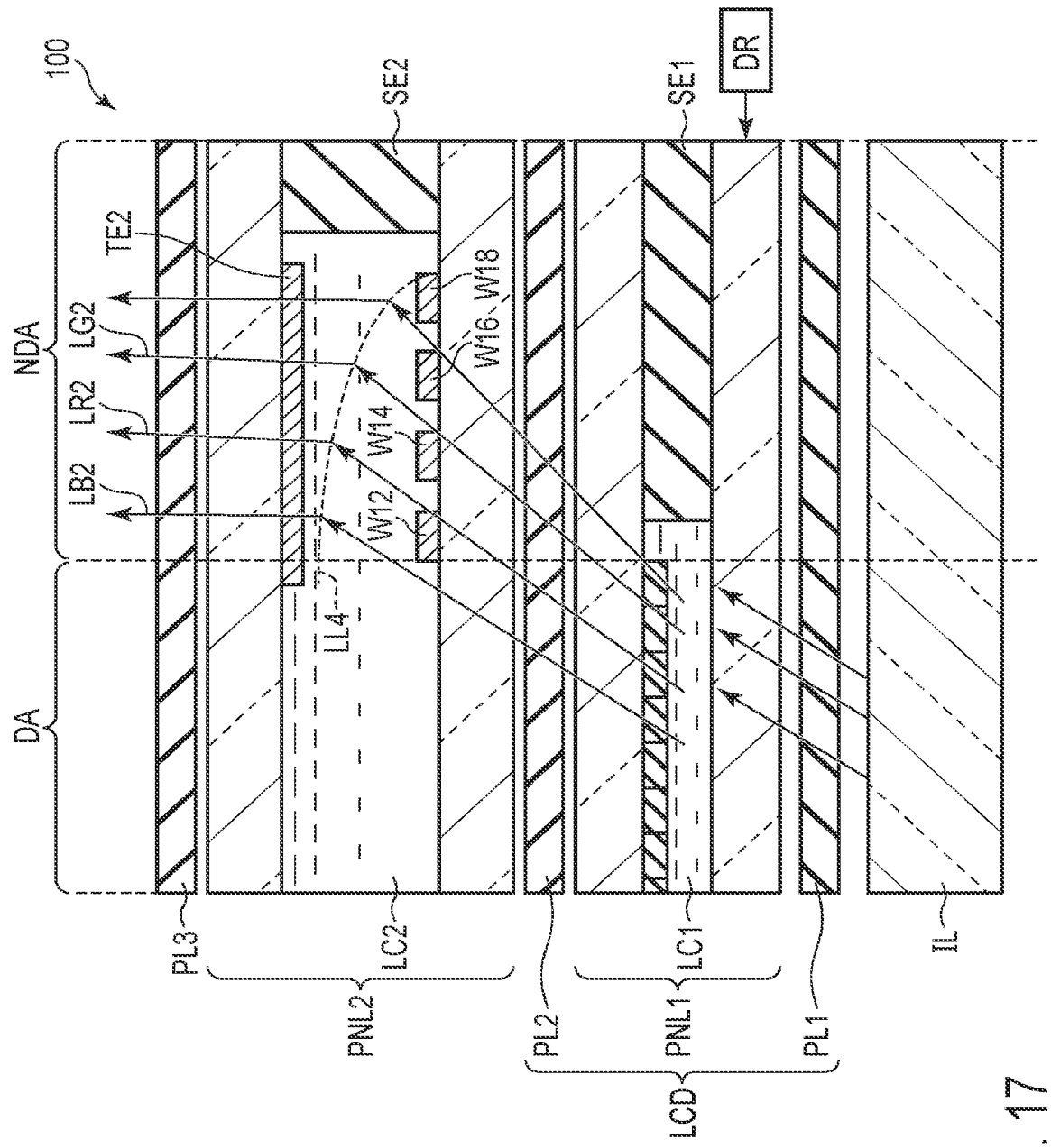
F I G. 17

ELECTRONIC APPARATUS

CROSS-REFERENCE TO RELATED APPLICATIONS

This application is a Continuation of U.S. application Ser. No. 17/443,190 filed Jul. 22, 2021, which is a Continuation Application of PCT Application No. PCT/JP2019/045472, filed Nov. 20, 2019 and based upon and claiming the benefit of priority from Japanese Patent Application No. 2019-012327, filed Jan. 28, 2019, the entire contents of all of which are incorporated herein by reference.

FIELD

Embodiments described herein relate generally to an electronic apparatus.

BACKGROUND

Recently, electronic apparatuses such as smartphones comprising a display part and a camera on the same surface side have been widely put into practical use. In such an electronic apparatus, the camera is disposed outside the display part, and there has been an increasing demand for expanding the display part while securing a space for installing the camera and the like.

Meanwhile, a technique of using a liquid crystal lens as a light refraction part of a three-dimensional image display device has been proposed.

BRIEF DESCRIPTION OF THE DRAWINGS

FIG. 6 is an illustration showing a shape example of a first transparent electrode TE1.

FIG. 11 is an illustration for explaining the third control example where a lens LL3 is formed in the second liquid crystal layer LC2 of the lens portion LP.

FIG. 12 is an illustration for explaining the first operation example.

FIG. 14 is an illustration for explaining the third operation example.

FIG. 17 is a cross-sectional view showing a configuration example of the second liquid crystal panel PNL2 shown in FIG. 8.

DETAILED DESCRIPTION

Figure 1:
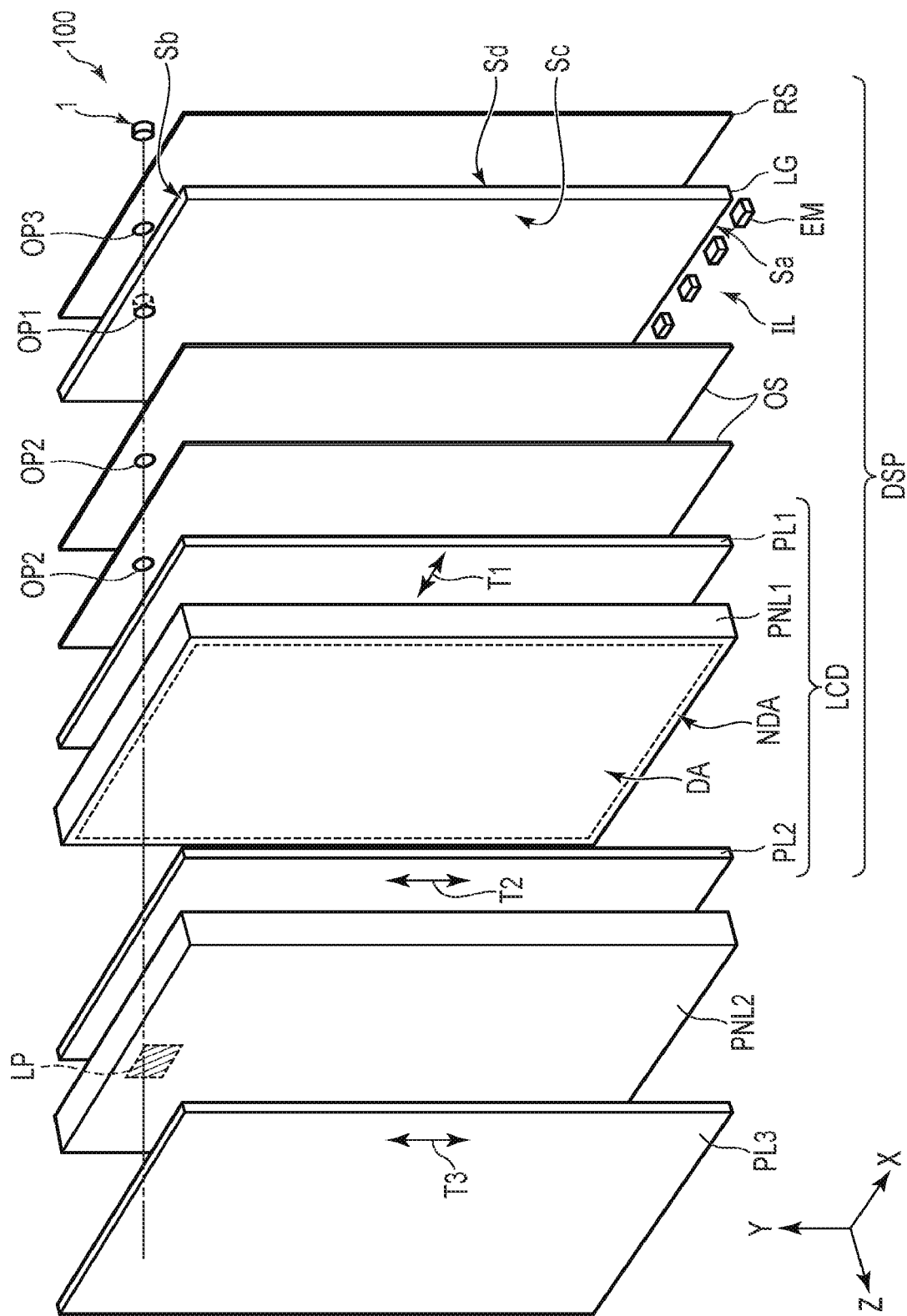
FIG. 1 is an exploded perspective view showing a configuration example of an electronic apparatus 100 comprising a display device DSP according to the present embodiment.

In general, according to one embodiment, there is provided an electronic apparatus comprising a first liquid crystal panel, a second liquid crystal panel overlapping the first liquid crystal panel, a camera overlapping the first liquid crystal panel and the second liquid crystal panel and receiving light via the first liquid crystal panel and the second liquid crystal panel. The first liquid crystal panel comprises a first liquid crystal layer, a first pixel electrode not overlapping the camera, a second pixel electrode overlapping the camera, and a color filter layer overlapping the first pixel electrode but not overlapping the second pixel electrode. The second liquid crystal panel comprises a plurality of first transparent electrodes overlapping the camera, a second transparent electrode overlapping the first transparent electrodes, and a second liquid crystal layer disposed between the first transparent electrodes and the second transparent electrode.

The present embodiment is described with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference signs, and detailed descriptions thereof which are considered redundant are omitted unless necessary.

FIG. 1 is an exploded perspective view showing a configuration example of an electronic apparatus 100 comprising a display device DSP according to the present embodiment. In one example, a first direction X, a second direction Y and a third direction Z are orthogonal to one another. However, these directions may intersect at an angle other than 90 degrees. The first direction X and the second direction Y correspond to directions parallel to the main surface of a substrate constituting the display device DSP, and the third direction Z corresponds to the thickness direction of the display device DSP.

The display device DSP comprises a first polarizer PL1 and a second polarizer PL2, a first liquid crystal panel PNL1, optical sheets OS, a light guide LG, light sources EM and a reflective sheet RS. The reflective sheet RS, the light guide LG, the optical sheets OS, the first polarizer PL1, the first liquid crystal panel PNL1 and the second polarizer PL2 are arranged in this order along the third direction Z. The light sources EM are arranged at intervals along the first direction X. The first polarizer PL1, the second polarizer PL2 and the first liquid crystal panel PNL1 constitute a liquid crystal element LCD comprising an optical switch function for light traveling along the third direction Z. This liquid crystal element LCD performs a function of transmitting light or blocking light for each area in an X-Y plane defined by the first direction X and the second direction Y.

The first liquid crystal panel PNL1 is formed in, for example, a flat plate shape parallel to the X-Y plane. The first liquid crystal panel PNL1 is disposed between the first polarizer PL1 and the second polarizer PL2. The first liquid crystal panel PNL1 comprises a display portion DA for displaying an image, and a frame-shaped non-display portion NDA surrounding the display portion DA. The display portion DA is a substantially rectangular area which does not include any notch, and four corners thereof may be rounded. Although the description of the detailed configuration of the first liquid crystal panel PNL1 is omitted here, the first liquid crystal panel PNL1 may comprise a configuration corresponding to any of a display mode using a lateral electric field along the main surface of a substrate, a display mode using a longitudinal electric field along the normal to the main surface of a substrate, a display mode using an inclined electric field inclined in an oblique direction with respect to the main surface of a substrate, and a display mode using an arbitrary combination of the lateral electric field, the longitudinal electric field and the inclined electric field described above. The main surface of the substrate here is a surface parallel to the X-Y plane.

The first polarizer PL1 and the second polarizer PL2 overlap at least the display portion DA with respect to the first liquid crystal panel PNL1. In one example, a transmission axis T1 of the first polarizer PL1 is parallel to the first direction X, and a transmission axis T2 of the second polarizer PL2 is parallel to the second direction Y. That is, the transmission axes T1 and T2 are orthogonal to each other in the X-Y plane.

An illumination device IL illuminates the first liquid crystal panel PNL1 from the back surface side. The illumination device IL is composed of, for example, the light sources EM, the light guide LG, the optical sheets OS and the reflective sheet RS.

The light guide LG has a side surface Sa opposed to the light sources EM, a side surface Sb on the opposite side to the side surface Sa, a main surface Sc opposed to the first liquid crystal panel PNL1, a main surface Sd on the opposite side to the main surface Sc, and a first opening OP1. The first opening OP1 is disposed on the opposite side to the side surface Sa. However, the first opening OP1 is not particularly limited but may be disposed on a side surface orthogonal to the side surface Sa. In the illustrated example, the first opening OP1 is a through hole penetrating the light guide LG in the third direction Z. It should he noted that the first opening OP1 may be a concave portion or a notch recessed from the side surface Sb toward the side surface Sa.

The optical sheets OS are disposed between the light guide LG and the first liquid crystal panel PNL1, and are opposed to the main surface Sc. The optical sheets OS each have a second opening OP2 overlapping the first opening OP1. The optical sheets OS each are, for example, a prism sheet or a diffusion sheet.

The reflective sheet RS is opposed to the main surface Sd. That is, the light guide LG is disposed between the reflective sheet RS and the optical sheets OS. The reflective sheet RS has a third opening OP3 overlapping the first opening OP1. The third opening OP3, the first opening OP1 and the second openings OP2 are arranged in this order along the third direction Z, and are disposed on the same straight line. The reflective sheet RS may be fixed to a frame, for example. In that case, an opening overlapping the first opening OP1 may also he formed in the frame.

The light sources EM each are, for example, a light-emitting diode (LED), and each emit white illumination light. The illumination light emitted from the light sources EM enters from the side surface Sa, and travels inside the light guide LG. Then, the illumination light guided by the light guide LG is emitted from the main surface Sc toward the first liquid crystal panel PNL1, and illuminates the first liquid crystal panel PNL1. The first liquid crystal panel PNL1, the first polarizer PL1 and the second polarizer PL2 selectively transmit the illumination light and thereby display an image in the display portion DA.

An electronic apparatus 100 incorporating the display device DSP therein comprises a camera 1, a second liquid crystal panel PNL2 and a third polarizer PL3.

The second liquid crystal panel PNL2 is formed in, for example, a flat plate shape parallel to the X-Y plane. Although the description of the detailed configuration of the second liquid crystal panel PNL2 is omitted here, the second liquid crystal panel PNL2 comprises a lens portion LP. The lens portion LP is disposed such that the lens portion LP overlaps the first to third openings OP1 to OP3 in the third direction Z. The third polarizer PL3 overlaps at least the lens portion LP with respect to the second liquid crystal panel PNL2. In one example, a transmission axis T3 of the third polarizer PL3 is parallel to the second direction Y. That is, the transmission axes T2 and T3 are parallel to each other in the X-Y plane. It should be noted that the third polarizer PL3 may be omitted.

The camera 1 is disposed such that the camera 1 overlaps the first to third openings OP1 to OP3 in the third direction Z. In addition, the camera 1 overlaps the display portion CA of the first liquid crystal panel PNL1 and the lens portion LP of the second liquid crystal panel PNL2 in the third direction Z.

Figure 2:
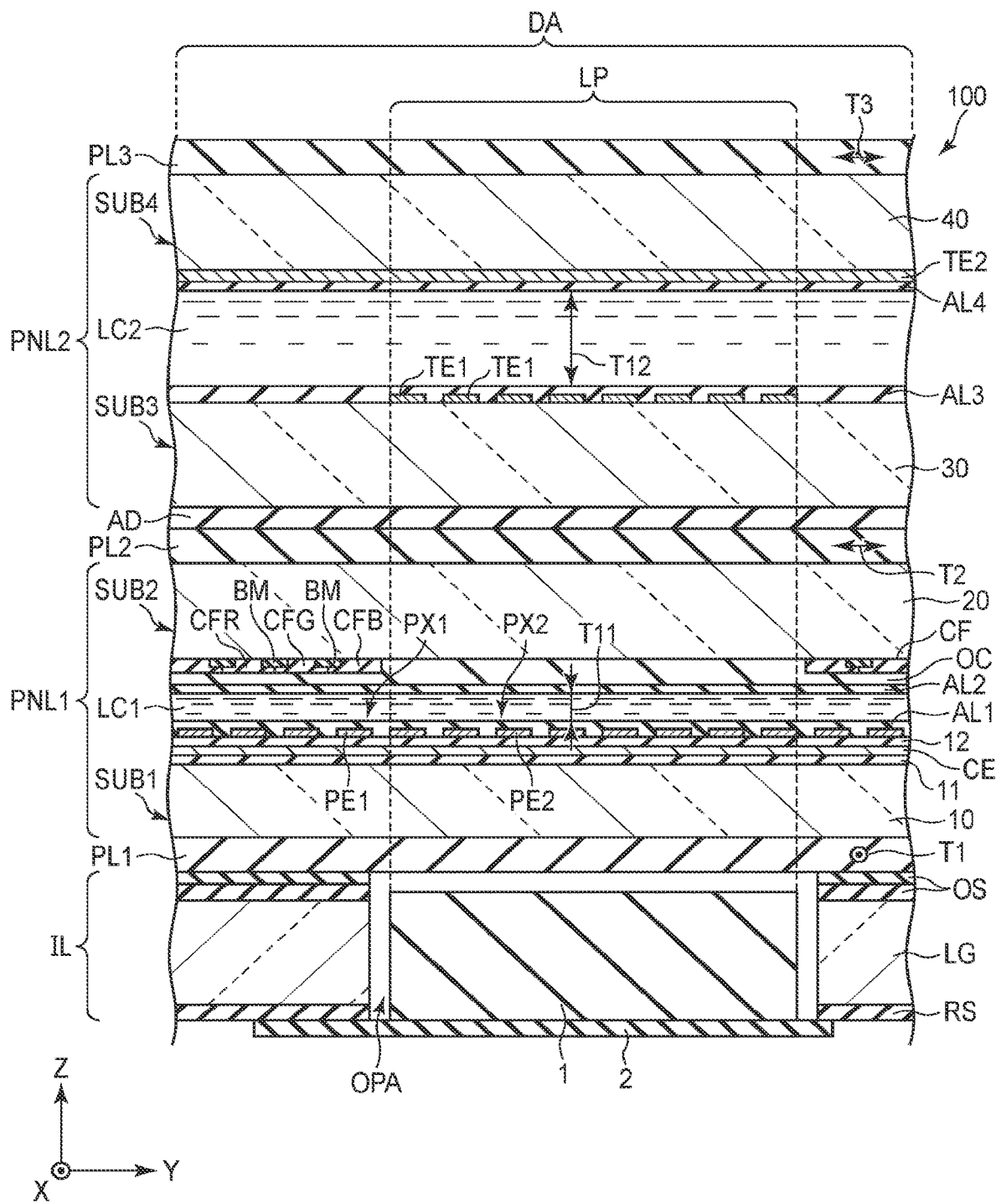
FIG. 2 is a cross-sectional view of the electronic apparatus 100 including a camera 1 shown in FIG. 1.

FIG. 2 is a cross-sectional view of the electronic apparatus 100 including the camera 1 shown in FIG. 1. The illumination device IL has an opening OPA. The first to third openings OP1 to OP3 shown in FIG. 1 are formed corresponding to the opening OPA. The camera 1 is disposed in the opening OPA. The camera 1 is electrically connected to a wiring board 2. The first liquid crystal panel PNL1 overlaps the illumination device IL. The second liquid crystal panel PNL2 overlaps the first liquid crystal panel PNL1. In addition, the first liquid crystal panel PNL1 and the second liquid crystal panel PNL2 overlap the camera 1.

The first polarizer PL1 is disposed between the illumination device IL and the first liquid crystal panel PNL1 and between the camera 1 and the first liquid crystal panel PNL1. The second polarizer PL2 is disposed between the first liquid crystal panel PNL1 and the second liquid crystal panel PNL2. The second liquid crystal panel PNL2 is disposed between the second polarizer PL2 and the third polarizer PL3. As described above, the transmission axis T1 of the first polarizer PL1 and the transmission axis T2 of the second polarizer PL2 are orthogonal to each other. In addition, the transmission axis T2 of the second polarizer PL2 and the transmission axis T3 of the third polarizer PL3 are parallel to each other.

The camera 1 is configured to receive visible light (light in a range of, for example, 400 nm to 700 nm) transmitted via the third polarizer PL3, the second liquid crystal panel PNL2, the second polarizer PL2, the first liquid crystal panel PNL1 and the first polarizer PL1.

The first liquid crystal panel PNL1 comprises a first substrate SUB1, a second substrate SUB2 and a first liquid crystal layer LC1. The first liquid crystal layer LC1 is disposed between the first substrate SUB1 and the second substrate SUB2. The main parts of the first liquid crystal panel PNL1 are described below. The first liquid crystal panel PNL1 described here has a configuration corresponding to the display mode using the lateral electric field. In the following description, a direction from the first substrate SUB1 toward the second substrate SUB2 is defined as above, and a direction from the second substrate SUB2 toward the first substrate SUB1 is defined as below.

The first substrate SUB1 comprises a first insulating substrate 10, insulating films 11 and 12, a common electrode CE, a first pixel electrode PE1, a second pixel electrode PE2 and an alignment film AL1. The first insulating substrate 10 is a transparent substrate such as a glass substrate or a flexible resin substrate. The insulating film 11 is disposed on the first insulating substrate 10. The common electrode CE is disposed on the insulating film 11, and is covered with the insulating film 12. The first pixel electrode PE1 and the second pixel electrode PE2 are disposed on the insulating film 12, and are covered with the alignment film AL1. The first pixel electrode PE1 and the second pixel electrode PE2 overlap the common electrode CE via the insulating film 12. The common electrode CE, the first pixel electrode PE1 and the second pixel electrode PE2 are formed of a transparent conductive material such as indium tin oxide (ITO) or indium zinc oxide (IZO). The first pixel electrode PE1 and the second pixel electrode PE2 each comprise a strip electrode. The common electrode CE is a plate-shaped electrode disposed in common to the pixels PX. The first pixel electrode PE1 is disposed in a first pixel PX1 which does not overlap the camera 1 in the display portion DA. The second pixel electrode PE2 is disposed in a second pixel PX2 which overlaps the camera 1 in the display portion DA.

The second substrate SUB2 comprises a second insulating substrate 20, a color filter layer CF, a light-shielding layer BM, a transparent layer OC and an alignment film AL2. The second insulating substrate 20 is a transparent substrate such as a glass substrate or a flexible resin substrate. The color filter layer CF is disposed in an area which does not overlap the camera 1, and is not disposed in an area which overlaps the camera 1. That is, while the color filter layer CF is disposed such that the color filter layer CF overlaps the first pixel electrode PE1, the color filter layer CF does not overlap the second pixel electrode PE2. The color filter layer CF comprises, for example, a red color filter CFR arranged in a red first pixel PX1, a green color filter CFG arranged in a green first pixel PX1, and a blue color filter CFB arranged in a blue first pixel PX1. The color filters CFR, CFG and CFB each overlap the first pixel electrode PE1. The light-shielding layer BM is disposed in an area which does not overlap the camera 1. That is, the light-shielding layer BM is disposed between the adjacent first pixel electrodes PE1, between the adjacent first pixels PX1, or between the adjacent color filters. It is preferable that the light-shielding layer BM should not he disposed in an area overlapping the camera 1. The transparent layer OC is, for example, an organic insulating film. The transparent layer OC covers the color filter layer CF in the first pixel PX1, and is in contact with the second insulating substrate 20 in the second pixel PX2. The transparent layer OC is covered with the alignment film AL2.

When the transmission axis T1 of the first polarizer PL1 and the transmission axis T2 of the second polarizer PL2 are orthogonal to each other, and when the wavelength of light transmitted through the first liquid crystal layer LC1 is λ and the retardation of the first liquid crystal layer LC1 is substantially zero or λ, the transmittance of the liquid crystal element LCD is minimized. Therefore, during the image capturing by the camera 1, the retardation of the first liquid crystal layer LC1 is set to greater than zero but less than λ in the second pixel PX2. When the retardation is about λ/2, the transmittance of the liquid crystal element LCD is maximized.

The second liquid crystal panel PNL2 comprises a third substrate SUB3, a fourth substrate SUB4 and a second liquid crystal layer LC2. The second liquid crystal layer LC2 is disposed between the third substrate SUB3 and the fourth substrate SUB4. The main parts of the second liquid crystal panel PNL2 are described below.

The third substrate SUB3 comprises a third insulating substrate 30, a plurality of first transparent electrodes TE1 and an alignment film AL3. The first transparent electrodes TE1 overlap the camera 1. In the lens portion LP, the first transparent electrodes TE1 are disposed on the third insulating substrate 30, and are covered with the alignment film AL3. The fourth substrate SUB4 comprises a fourth insulating substrate 40, a second transparent electrode TE2 and an alignment film AL4. The second transparent electrode TE2 overlaps the first transparent electrodes TE1 directly above the camera 1. In the lens portion LP, the second transparent electrode TE2 is disposed below the fourth insulating substrate 40, and is covered with the alignment film AL4. The third insulating substrate 30 and the fourth insulating substrate 40 each are a transparent substrate such as a glass substrate or a flexible resin substrate. The first transparent electrodes TE1 and the second transparent electrode TE2 are formed of a transparent conductive material. The second liquid crystal layer LC2 is disposed between the first transparent electrodes TE1 and the second transparent electrode TE2.

Directly above the camera 1, the first liquid crystal layer LC1 has a thickness T11, and the second liquid crystal layer LC2 has a thickness T12. The thicknesses T11 and T12 correspond to a length along the third direction Z. The thickness T12 is greater than the thickness T11, and corresponds to about greater than or equal to 10 times but less than or equal to 50 times the thickness T11, for example. In one example, the thickness T12 is greater than or equal to 30 μm but less than or equal to 150 μm, more specifically, 50 μm to 100 μm.

The first polarizer PL1 is bonded to the first insulating substrate 10, the second polarizer PL2 is bonded to the second insulating substrate 20, and the third polarizer PL3 is bonded to the fourth insulating substrate 40. The third insulating substrate 30 is bonded to the second polarizer PL2 by a transparent adhesive resin AD. It should be noted that the first polarizer PL1, the second polarizer PL2 and the third polarizer PL3 may comprise a retarder, a scattering layer, an antireflective layer and the like as needed.

Figure 3:
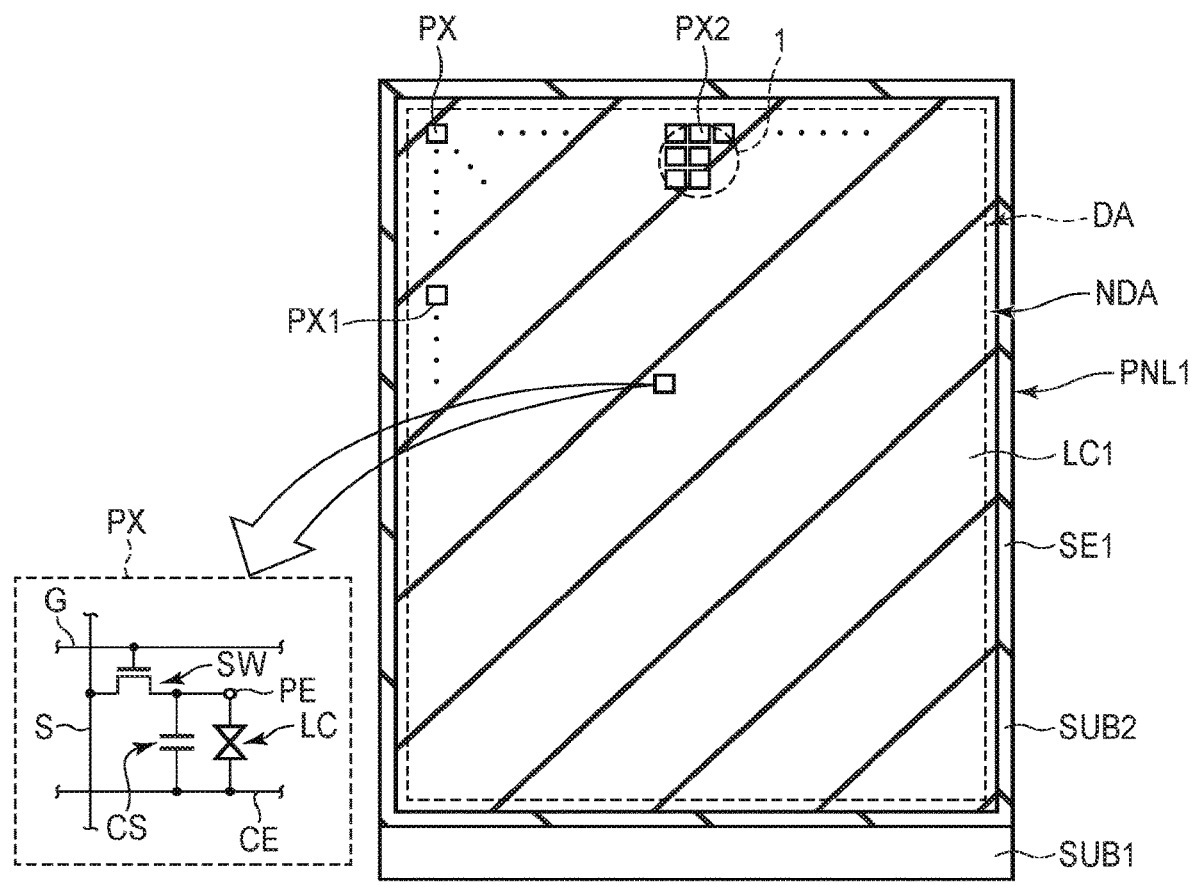
FIG. 3 is a plan view showing a configuration example of a first liquid crystal panel PNL1 shown in FIG. 1.

FIG. 3 is a plan view showing a configuration example of the first liquid crystal panel PNL1 shown in FIG. 1. In FIG. 3, the first liquid crystal layer LC1 and a sealant SE1 are shown by different diagonal lines. The display portion DA is a substantially rectangular area which does not include any notch, and is located on the inside surrounded by the sealant SE1. The sealant SE1 is located in the non-display portion NDA, and bonds the first substrate SUB1 and the second substrate SUB2 together and seals in the first liquid crystal layer LC1.

The first liquid crystal panel PNL1 comprises pixels PX arranged in a matrix in the first direction X and the second direction Y in the display portion DA. Each pixel PX in the display portion DA has the same circuit. The display portion DA comprises, as the pixels PX, the first pixel PX1 which does not overlap the camera 1 and the second pixel PX2 which overlaps the camera 1.

As shown enlarged in FIG. 3, each pixel PX comprises a switching element SW, a pixel electrode PE (the first pixel electrode PE1 or the second pixel electrode PE2), the common electrode CE, the first liquid crystal layer LC1 and the like. The switching element SW is composed of, for example, a thin-film transistor (TFT), and is electrically connected to a scanning line G and a signal line S. The pixel electrode PE is electrically connected to the switching element SW. Each pixel electrode PE is opposed to the common electrode CE. The first liquid crystal layer LC1 is driven by an electric field generated between the pixel electrode PE and the common electrode CE. A capacitance CS formed between, for example, an electrode having the same potential as the common electrode CE and an electrode having the same potential as the pixel electrode PE.

Figure 4:
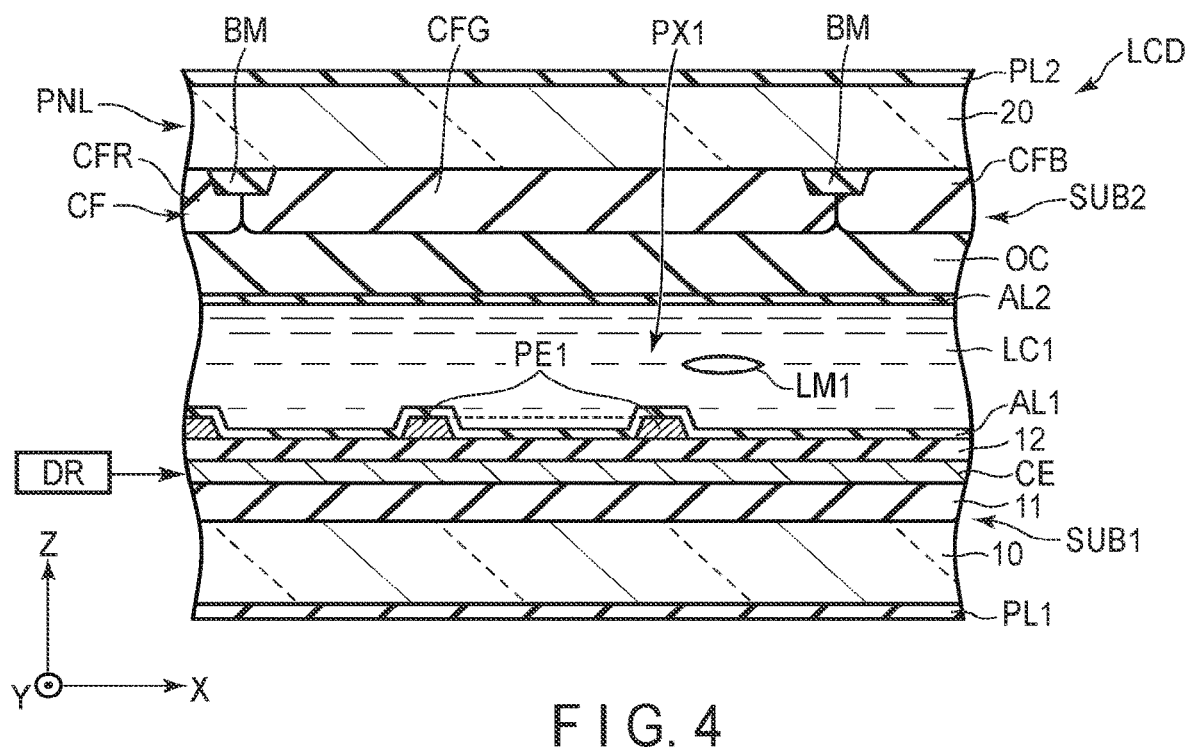
FIG. 4 is a cross-sectional view of a liquid crystal element LCD including a first pixel PX1 shown in FIG. 3.

FIG. 4 is a cross-sectional view of the liquid crystal element LCD including the first pixel PX1 shown in FIG. 3. The driver DR which drives the liquid crystal element LCD includes, for example, a scanning line drive circuit electrically connected to the scanning line G shown in FIG. 3, and a signal line drive circuit electrically connected to the signal line S shown in FIG. 3. With respect to the first pixel PX1, the driver DR outputs a signal necessary for image display, and controls the transmittance of the liquid crystal element LCD. The transmittance in the first pixel PX1 of the liquid crystal element LCD is controlled according to the magnitude of voltage applied to the first liquid crystal layer LC1.

In the first pixel PX1 in an off state where no voltage is applied to the first liquid crystal layer LC1, liquid crystal molecules LM1 contained in the first liquid crystal layer LC1 are initially aligned in a predetermined direction between the alignment films AL1 and AL2. In the off state, light guided from the light source EM shown in FIG. 1 to the first pixel PX1 is absorbed by the first polarizer PL1 and the second polarizer PL2. Therefore, the liquid crystal element LCD displays black in the first pixel PX1 in the off state.

In the first pixel PX1 in an on state where voltage is applied to the first liquid crystal layer LC1, the liquid crystal molecules LM1 are aligned in a direction different from the initial alignment direction by an electric field formed between the first pixel electrode PE1 and the common electrode CE, and the alignment direction is controlled by the electric field. In the on state, a part of light guided from the light source EM to the first pixel PX1 is transmitted through the first polarizer PL1 and the second polarizer PL2. Therefore, the liquid crystal element LCD displays a color corresponding to the color filter layer CF in the first pixel PX1 in the on state.

The above example corresponds to what is called a normally black mode in which black is displayed in the off state. However, a normally white mode in which black is displayed in the on state (white is displayed in the off state) may be applied.

Figure 5:
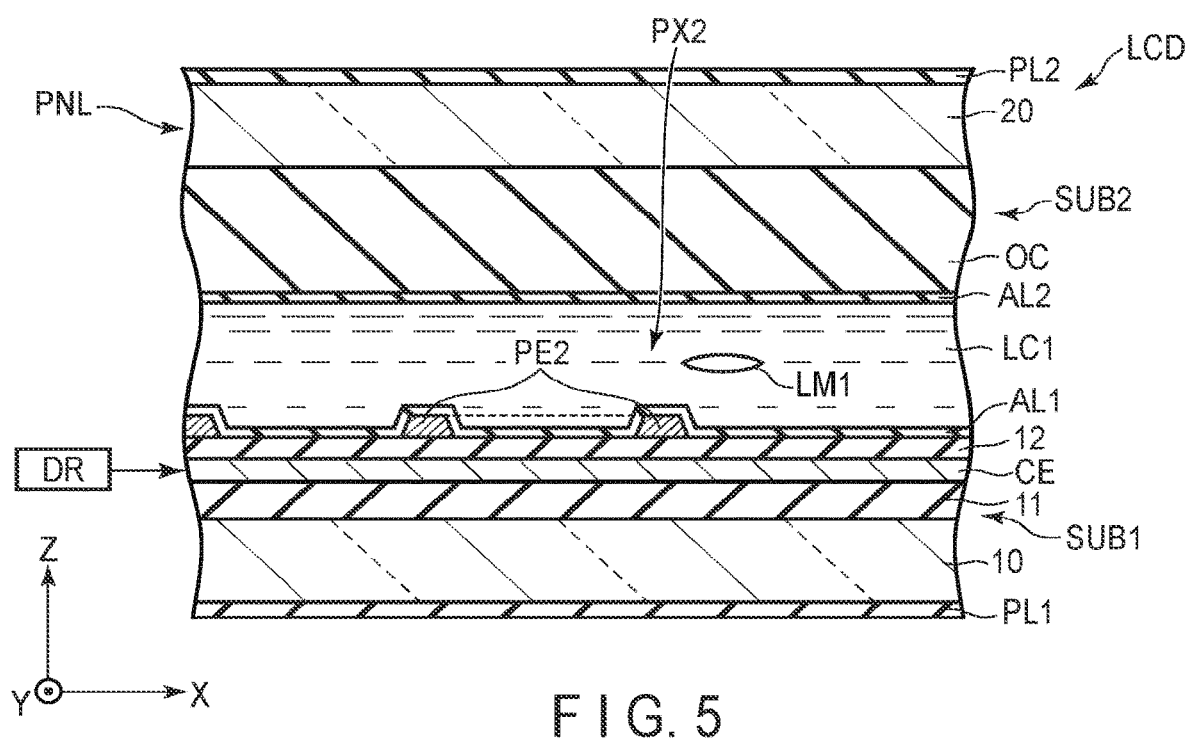
FIG. 5 is a cross-sectional view of the liquid crystal element LCD including a second pixel PX2 shown in FIG. 3.

FIG. 5 is a cross-sectional view of the liquid crystal element LCD including the second pixel PX2 shown in FIG. 3. The second pixel PX2 is different from the first pixel PX1 shown in FIG. 4 in that the second substrate SUB2 does not comprise the color filter layer CF and the light-shielding layer BM. That is, the transparent layer OC is in contact with the second insulating substrate 20 directly above the second pixel electrode PE2.

As is the case with the first pixel PX1, the transmittance in the second pixel PX2 of the liquid crystal element LCD is controlled by the driver DR. That is, in the second pixel PX2 in the off state where no voltage is applied to the first liquid crystal layer LC1, as is the case in the first pixel PX1 in the off state, the liquid crystal element LCD has the minimum transmittance and displays black. That is, the liquid crystal element LCD performs the light-blocking function in the second pixel PX2.

In the second pixel PX2 in the on state where voltage is applied to the first liquid crystal layer LC1, a part of light guided from the light source EM to the second pixel PX2 is transmitted through the first polarizer PL1 and the second polarizer PL2. In addition, in the second pixel PX2 in the on state, the liquid crystal element LCD forms a light-transmitting state where the liquid crystal element LCD transmits light passing through the second liquid crystal panel PNL2 and traveling toward the camera 1. In the second pixel PX2 in the on state, when the liquid crystal element LCD is controlled to have the maximum transmittance, the liquid crystal element LCD displays white or is in a transparent state. In addition, in the second pixel PX2, when the liquid crystal element LCD is controlled to have an intermediate transmittance between the minimum transmittance and the maximum transmittance, the liquid crystal element LCD can display gray. That is, the liquid crystal element LCD performs the light-transmitting function in the second pixel PX2.

According to the present embodiment, the camera 1 overlaps the display portion DA of the first liquid crystal panel PNL1. Therefore, there is no need to provide a space for installing the camera 1 in the non-display portion NDA. Consequently, the display portion DA can be expanded.

In addition, there is no need to provide a space for installing the camera 1 in the non-display portion NDA. Therefore, the frame width of the non-display portion NDA can be reduced as compared with when the camera 1 overlaps the non-display portion NDA.

Furthermore, since the camera 1 does not overlap the color filter layer CF, light entering the camera 1 via the first liquid crystal panel PNL1 is hardly affected by the color filter layer CF. Therefore, undesired absorption and coloring by the color filter layer CF can be suppressed.

FIG. 6 is an illustration showing a shape example of the first transparent electrode TE1. In the illustrated example, eight first transparent electrodes TE11 to TE18 are disposed in the lens portion LP. The first transparent electrodes TE11 to TE18 each are formed in a strip shape. In the illustrated example, the first transparent electrodes TE11 to TE18 extend in the first direction X, and are arranged at intervals in the second direction Y. The second transparent electrode TE2 overlaps the first transparent electrodes TE11 to TE18 in planar view. The second transparent electrode TE2 is formed in a substantially rectangular shape, but the shape is not limited to the illustrated example. The number of the first transparent electrodes is not limited to the illustrated example, that is, eight. It should be noted that the first transparent electrodes TE11 to TE18 may extend in the second direction Y and may be arranged at intervals in the first direction X. The camera 1 overlaps the first transparent electrodes TE11 to TE18 as shown by a dotted line in the drawing.

The first transparent electrodes TE11 to TE18 are electrically connected to the driver DR via wiring lines W11 to W18 and switching elements SW11 to SW18, respectively. The second transparent electrode TE2 is electrically connected to the driver DR via a switching element SW2. The driver DR can apply predetermined voltages to the first transparent electrodes TE11 to TE18 and the second transparent electrode TE2, respectively.

Figure 7:
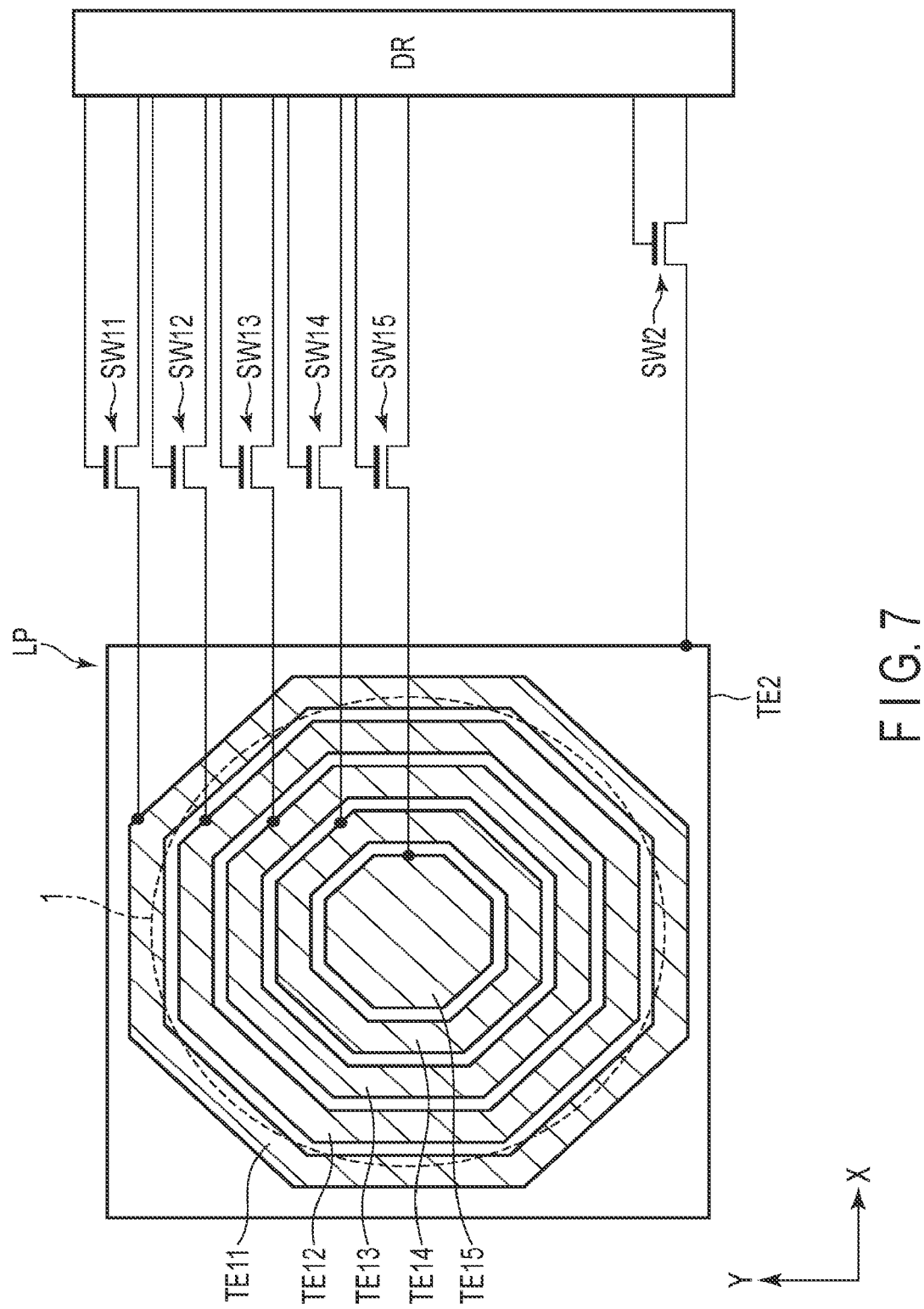
FIG. 7 is an illustration showing another shape example of the first transparent electrode TE1.

FIG. 7 is an illustration showing another shape example of the first transparent electrode TE1. In the illustrated example, five first transparent electrodes TE11 to TE15 are disposed in the lens portion LP. The first transparent electrodes TE11 to TE14 each are formed in a ring shape. The first transparent electrode TE15 is formed in a polygonal shape. It should he noted that the first transparent electrodes TE11 to TE15 may be formed in an annular shape or a circular shape. In addition, the number of the first transparent electrodes is not limited to the illustrated example, that is, five. The camera 1 overlaps the first transparent electrodes TE11 to TE15 as shown by a dotted line in the drawing.

The driver DR can apply predetermined voltages to the first transparent electrodes TE11 to TE15 via the switching elements SW11 to SW15, respectively. In addition, the driver DR can apply a predetermined voltage to the second transparent TE2 via the switching element SW2.

Figure 8:
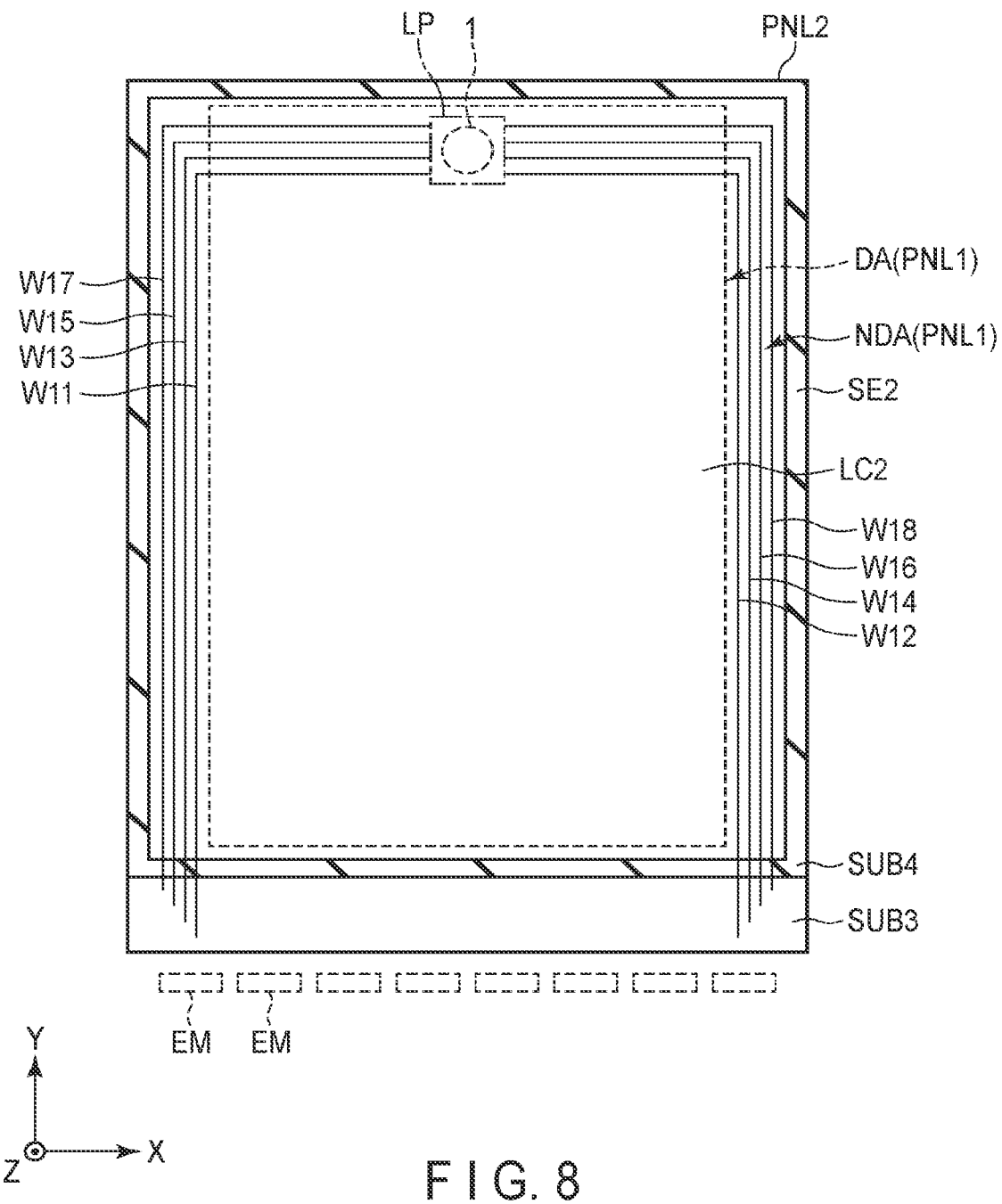
FIG. 8 is a plan view showing a configuration example of a second liquid crystal panel PNL2 shown in FIG. 1.

FIG. 8 is a plan view showing a configuration example of the second liquid crystal panel PNL2 shown in FIG. 1. A sealant SE2 bonds the third substrate SUB3 and the fourth substrate SUB4 together, and seals in the second liquid crystal layer LC2. The lens portion LP overlaps the second liquid crystal layer LC2. In addition, the lens portion LP overlaps the camera 1 and also overlaps the display portion DA of the first liquid crystal panel PNL1 as described above. Although the lens portion LP is shown simplified here, for example, in a configuration in which the lens portion LP comprises the first transparent electrodes TE11 to TE18 shown in FIG. 6, the wiring lines W11 to W18 are disposed in the third substrate SUB3 as is the case with the first transparent electrodes TE11 to TE18. As in the illustrated example, in the wiring lines W11 to W18, parts overlapping the display portion DA should preferably be formed of a transparent conductive material from the perspective of suppressing a decrease in the transmittance in the display portion DA. In addition, in the wiring lines W11 to W18, parts overlapping the non-display portion NDA may be formed of a transparent conductive material or may be formed of a metal material from the perspective of achieving low resistance. In the illustrated example, the odd-numbered wiring lines W11, W13, W15 and W17 are disposed on the left side of the display portion DA, and the even-numbered wiring lines W12, W14, W16 and W18 are disposed on the right side of the display portion DA. It should be noted that the layout of the wiring lines W11 to W18 is not limited to the illustrated example.

Figure 9B:
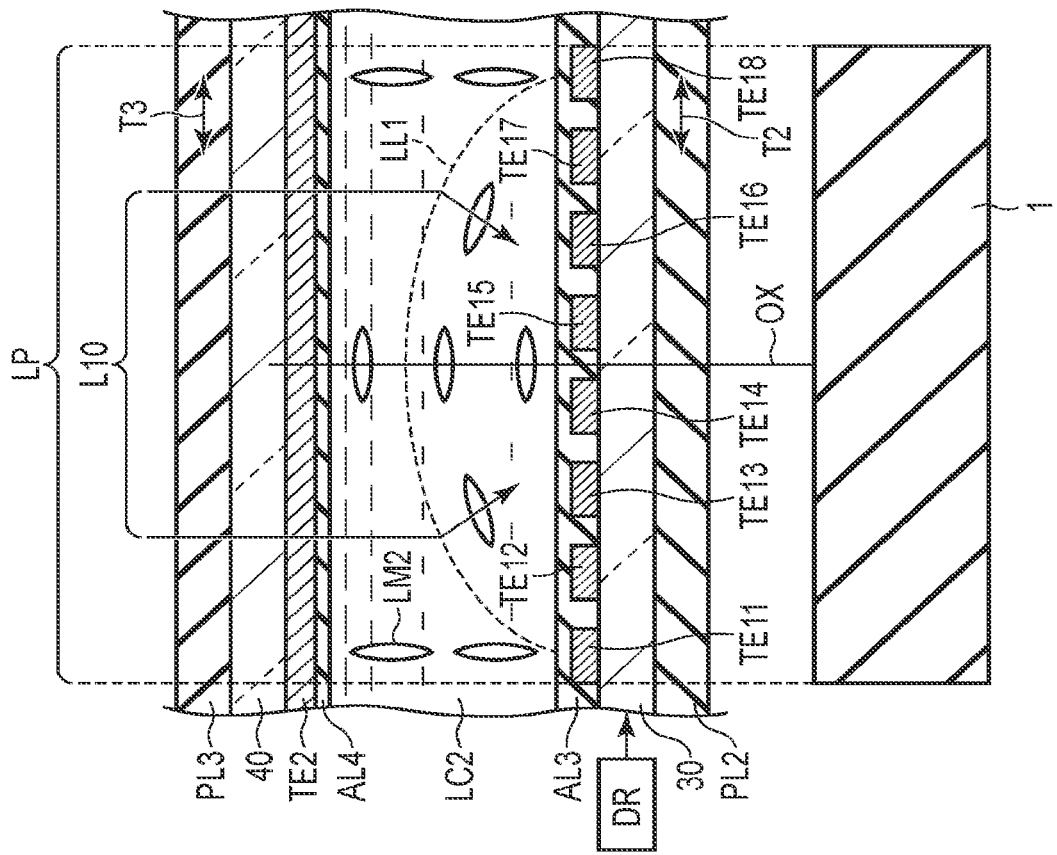
FIG. 9B is an illustration for explaining the first control example where the lens LL1 is formed in the second liquid crystal layer LC2 of the lens portion LP.
Figure 9A:
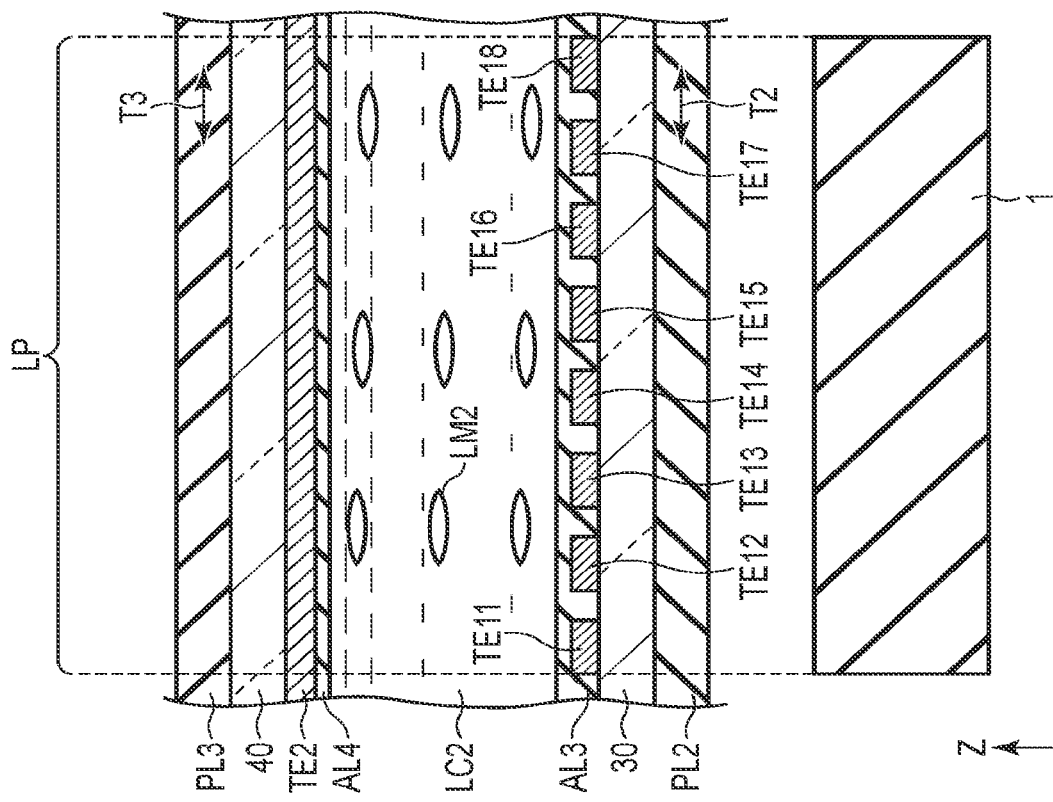
FIG. 9A is an illustration for explaining the first control example where a lens LL1 is formed in a second liquid crystal layer LC2 of a lens portion LP.

FIGS. 9A and 9B each are an illustration for explaining the first control example where a lens LL1 is formed in the second liquid crystal layer LC2 of the lens portion LP.

FIG. 9A shows the lens portion LP in the off state. In the off state, no voltage is applied to the first transparent electrodes TE11 to TE18 and the second transparent electrode TE2. Therefore, no voltage is applied to the second liquid crystal layer LC2. The second liquid crystal layer LC2 contains liquid crystal molecules LM2. For example, it is assumed that the second liquid crystal layer LC2 has a positive dielectric anisotropy, and the liquid crystal molecules LM2 are initially aligned horizontally along the main surface of the substrate in the off state. The transmission axis T2 of the second polarizer PL2 and the transmission axis T3 of the third polarizer PL3 are parallel to the initial alignment direction of the liquid crystal molecules LM2. No lens is formed in the lens portion LP in the off state.

FIG. 9B shows the lens portion LP in the on state. In the on state, the driver DR applies voltages for forming the lens LL1 in the second liquid crystal layer LC2 to the first transparent electrodes TE11 to TE18 and the second transparent electrode TE2. In the on state, the liquid crystal molecules LM2 are aligned such that major axes thereof are along an electric field between the first transparent electrodes TE11 to TE18 and the second transparent electrode TE2.

An example of when the lens LL1 functions as a convex lens as illustrated is described below. As for the first transparent electrodes TE11 to TE18, a higher voltage is applied as the distance from an optical axis OX of the camera 1 increases. That is, the voltage applied to the first transparent electrode TE11 is higher than the voltage applied to the first transparent electrode TE14. In one example, a voltage of 4 V is applied to the first transparent electrodes TE11 and TE18, a voltage of 3 V is applied to the first transparent electrodes TE12 and TE17, a voltage of 2 V is applied to the first transparent electrodes TE13 and TE16, and a voltage of 1 V is applied to the first transparent electrodes TE14 and TE15. On the other hand, a voltage of, for example, 0 V is applied to the second transparent electrode TE2. In an area in which each of the first transparent electrodes TE11 to TE18 and the second transparent electrode TE2 are opposed to each other, a longitudinal electric field along the third direction Z or a lateral electric field along the main surface of the substrate is formed. The alignment direction of the liquid crystal molecules LM2 is controlled by the interaction of these electric fields. The liquid crystal molecules LM2 have a refractive anisotropy $\Delta n$. Therefore, the second liquid crystal layer LC2 has a refractive index distribution corresponding to the alignment state of the liquid crystal molecules LM2. Alternatively, the second liquid crystal layer LC2 has a retardation distribution or a phase distribution represented by $\Delta n \cdot d$ where d is the thickness along the third direction Z of the second liquid crystal layer LC2. The illustrated lens LL1 is formed by a refractive index distribution, a retardation distribution or a phase distribution based on the potential difference between the first transparent electrodes TE11 to TE18 and the second transparent electrode TE2. The lens LL1 is formed isotropically with respect to the optical axis OX.

When the lens portion LP comprises the first transparent electrodes TE11 to TE18 having the shape shown in FIG. 6, the lens LL1 can form a cylindrical lens extending in the first direction X. When the lens portion LP comprises the first transparent electrodes TE11 to TE15 having the shape shown in FIG. 7, the lens LL1 can form a convex lens centered on the optical axis OX.

Of light L10 traveling toward the camera 1, linearly polarized light transmitted through the third polarizer PL3 is refracted by the lens LL1, and enters the camera 1. That is, the lens LL1 mainly exerts a focusing effect on the light L10. It is also possible to form a lens which exerts a dispersing effect on the light L10 by controlling voltages applied to the first transparent electrodes TE11 to TE15 and the second transparent electrode TE2 by the driver DR.

Figure 10:
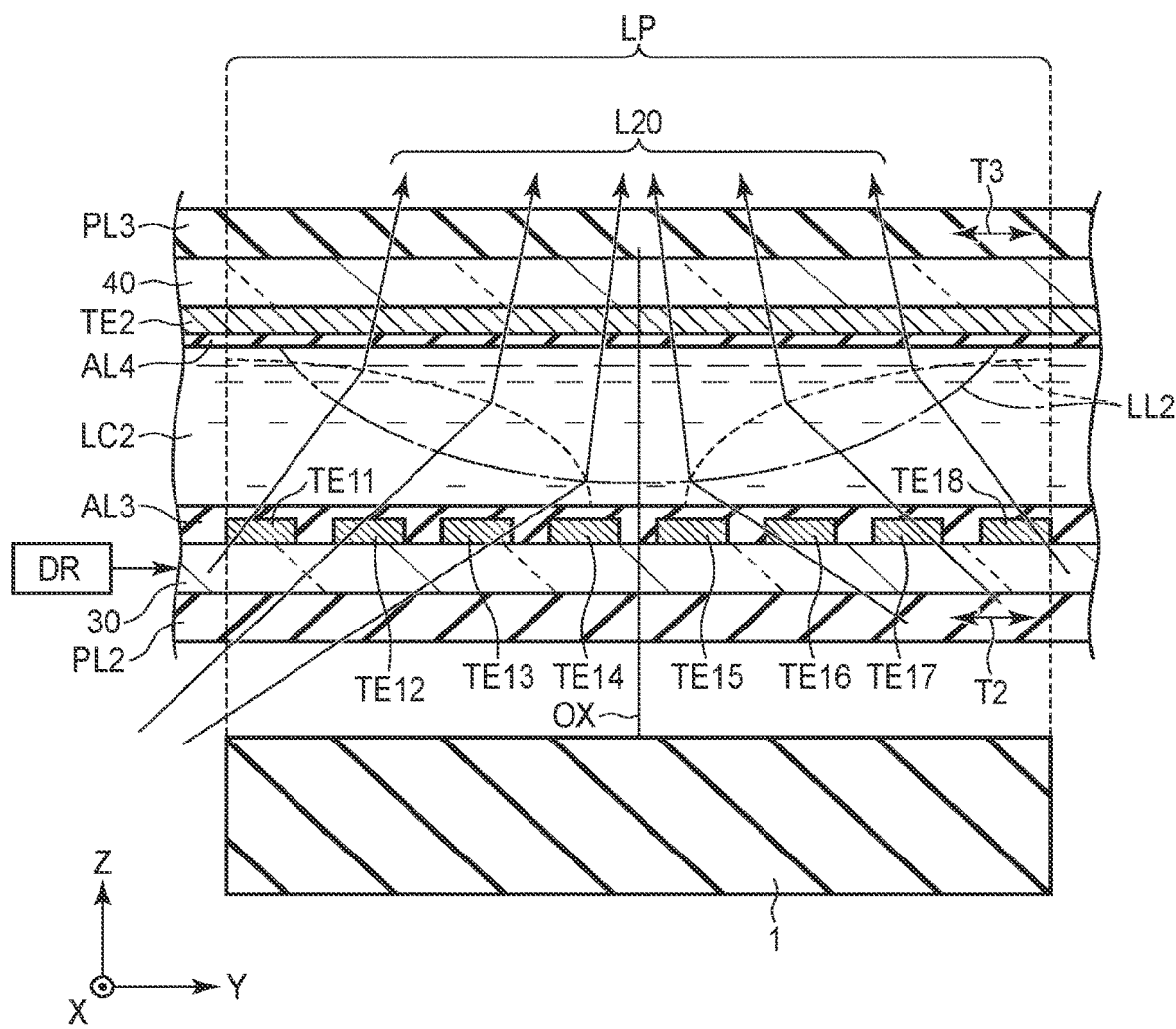
FIG. 10 is an illustration for explaining the second control example where a lens LL2 is formed in the second liquid crystal layer LC2 of the lens portion LP.

FIG. 10 is an illustration for explaining the second control example where a lens LL2 is formed in the second liquid crystal layer LC2 of the lens portion LP. In the second control example, the driver DR applies voltages to the first transparent electrodes TE11 to TE18 and the second transparent electrode TE2 such that the lens end of the lens LL2 formed in the second liquid crystal layer LC2 overlaps the camera 1 (shown by a dotted line in the drawing). Alternatively, the driver DR applies voltages to the first transparent electrodes TE11 to TE18 and the second transparent electrode TE2 such that the lens LL2 formed in the second liquid crystal layer LC2 functions as a concave lens (shown by a dashed-dotted line).

In the second control example, as for the first transparent electrodes TE11 to TE18, a lower voltage is applied as the distance from the optical axis OX of the camera 1 increases. That is, the voltage applied to the first transparent electrode TE11 is lower than the voltage applied to the first transparent electrode TE14. In one example, a voltage of 1 V is applied to the first transparent electrodes TE11 and TE18, a voltage of 2 V is applied to the first transparent electrodes TE12 and TE17, a voltage of 3 V is applied to the first transparent electrodes TE13 and TE16, and a voltage of 4 V is applied to the first transparent electrodes TE14 and TE15. On the other hand, a voltage of, for example, 0 V is applied to the second transparent electrode TE2. The illustrated lens LL2 is formed by the refractive index distribution, the retardation distribution or the phase distribution of the second liquid crystal layer LC2. In the illustrated example, the lens LL2 is formed isotropically with respect to the optical axis OX. However, the lens LL2 may be formed asymmetrically with respect to the optical axis OX.

The illustrated lens LL2 exerts an effect of refracting display light L20 guided to the periphery of the camera 1 toward directly above the camera 1. Since the transmission axis T2 of the second polarizer PL2 is parallel to the transmission axis T3 of the third polarizer PL3, the display light L20 refracted in the lens portion LP is emitted from an area overlapping the camera 1. That is, the display light L20 is observed on the front surface (observer side) of the camera 1. Accordingly, the visibility of the camera 1 can be reduced when the electronic apparatus 100 is observed from the third polarizer PL3 side.

FIG. 11 is an illustration for explaining the third control example where a lens LL3 is formed in the second liquid crystal layer LC2 of the lens portion LP. In the third control example, the driver DR applies voltages to the first transparent electrodes TE11 to TE18 and the second transparent electrode TE2 such that the lens LL3 asymmetrical with respect to the optical axis OX of the camera 1 is formed in the second liquid crystal layer LC2.

In the third control example, as for the first transparent electrodes TE11 to TE18, a higher voltage is applied as the distance from the light source EM increases. That is, the voltage applied to the first transparent electrode TE11 is lower than the voltage applied to the first transparent electrode TE18. In one example, a voltage of 1 V is applied to the first transparent electrodes TE11 and TE12, a voltage of 2 V is applied to the first transparent electrodes TE13 and TE14, a voltage of 3 V is applied to the first transparent electrodes TE15 and TE16, and a voltage of 4 V is applied to the first transparent electrodes TE17 and TE18. On the other hand, a voltage of, for example, 0 V is applied. to the second transparent electrode TE2. The illustrated lens LL3 is formed by the refractive index distribution, the retardation distribution or the phase distribution of the second liquid crystal layer LC2.

As is the case with the lens LL2, the illustrated lens LL3 exerts an effect of refracting the display light 20L guided to the periphery of the camera 1 toward directly above the camera 1. Accordingly, the visibility of the camera 1 can be reduced when the electronic apparatus 100 is observed from the third polarizer PL3 side.

When the light sources EM shown in FIG. 1 are arranged in the first direction X and emit illumination light along the second direction Y, it is preferable that the first transparent electrodes TE11 to TE18 described with reference to FIG. 6 should be formed in a strip shape along the first direction X and be arranged in the second direction Y. Accordingly, the lens LL3 suitable for emitting illumination light directly above the camera 1 can be formed.

As described above, various lens LL can be formed in the second liquid crystal layer LC2 by controlling voltages applied to the first transparent electrodes TE11 to TE18 by the driver DR. In addition, the focus of the lens LL can also be controlled by the voltage control by the driver DR.

«Camera On»

The following describes the first to third operation examples in a camera on state where the camera 1 captures an image. In the camera on state, the first pixel PX1 may be in the on state or the off state.

FIG. 12 is an illustration for explaining the first operation example. The second pixel PX in the first liquid crystal panel PNL1 is in the on state. The liquid crystal element LCD composed of the first liquid crystal panel PNL1, the first polarizer PL1 and the second polarizer PL2 forms the light-transmitting state where the liquid crystal element LCD transmits light traveling toward the camera 1 in the second pixel PX2 in the on state as described with reference to FIG. 5. The lens portion LP in the second liquid crystal panel PNL2 is in the off state, and no lens is formed in the second liquid crystal layer LC2 as described with reference to FIG. 9A.

Of light 130 toward the camera 1, first linearly polarized light POL1 having a vibration plane in the second direction Y is transmitted through the third polarizer PL3. The first linearly polarized light POL1 is transmitted through the second polarizer PL2 almost without being subjected to any lens effect in the lens portion LP. The first linearly polarized light POL1 is modulated to second linearly polarized light POL2 having a vibration plane in the first direction X in the second pixel PX2 in the on state. The second linearly polarized light POL2 is transmitted through the first polarizer PL1, and enters the camera 1. Accordingly, the camera 1 can capture an image.

Figure 13:
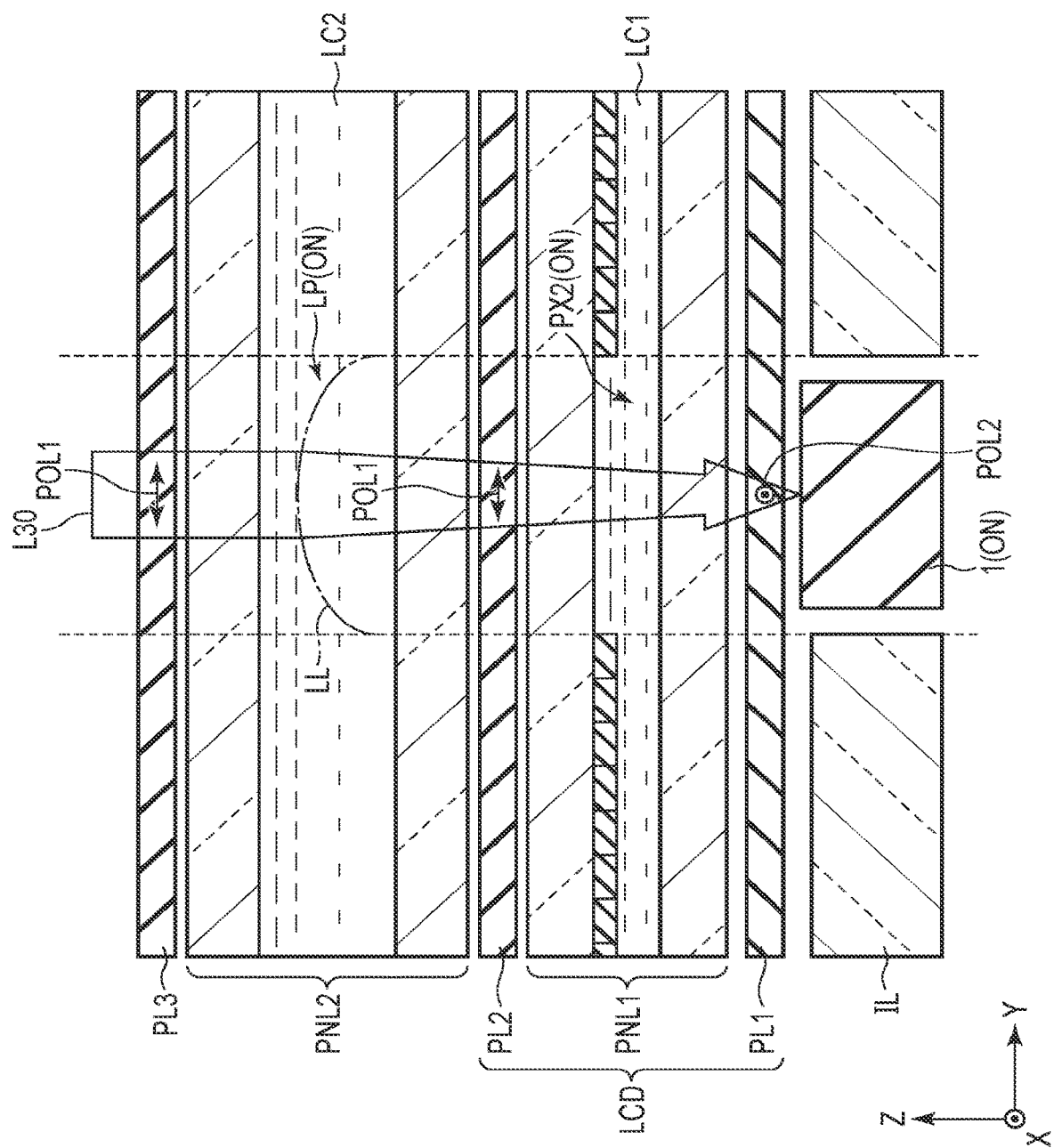
FIG. 13 is an illustration for explaining the second operation example.

FIG. 13 is an illustration for explaining the second operation example. The lens portion LP is in the on state, and the lens LL functioning as a convex lens is formed in the second liquid crystal layer LC2.

Of the light L30 toward the camera 1, the first linearly polarized light POL1 is transmitted through the third polarizer PL3, and is subjected to the focusing effect of the lens LL in the lens portion LP. The focused first linearly polarized light POL1 is transmitted through the second polarizer PL2, and is modulated to the second linearly polarized light POL2 in the second pixel PX2 in the on state. The second linearly polarized light POL2 is transmitted through the first polarizer PL1, and enters the camera 1. Accordingly, the camera 1 can capture an image.

FIG. 14 is an illustration for explaining the third operation example. The lens portion LP is in the on state, and the lens LL functioning as a concave lens is formed in the second liquid crystal layer LC2.

Of the light L30 toward the camera 1, the first linearly polarized light POL1 is transmitted through the third polarizer PL3, and is subjected to the dispersing effect of the lens LL in the lens portion LP. The dispersed first linearly polarized light POL1 is transmitted through the second polarizer PL2, and is modulated to the second linearly polarized light POL2 in the second pixel PX2 in the on state. The second linearly polarized light POL2 is transmitted through the first polarizer PL1, and enters the camera 1. Accordingly, the camera 1 can capture an image.

«Camera Off»

The following describes the fourth and fifth operation examples in a camera off state where the camera 1 is not operated.

Figure 15:
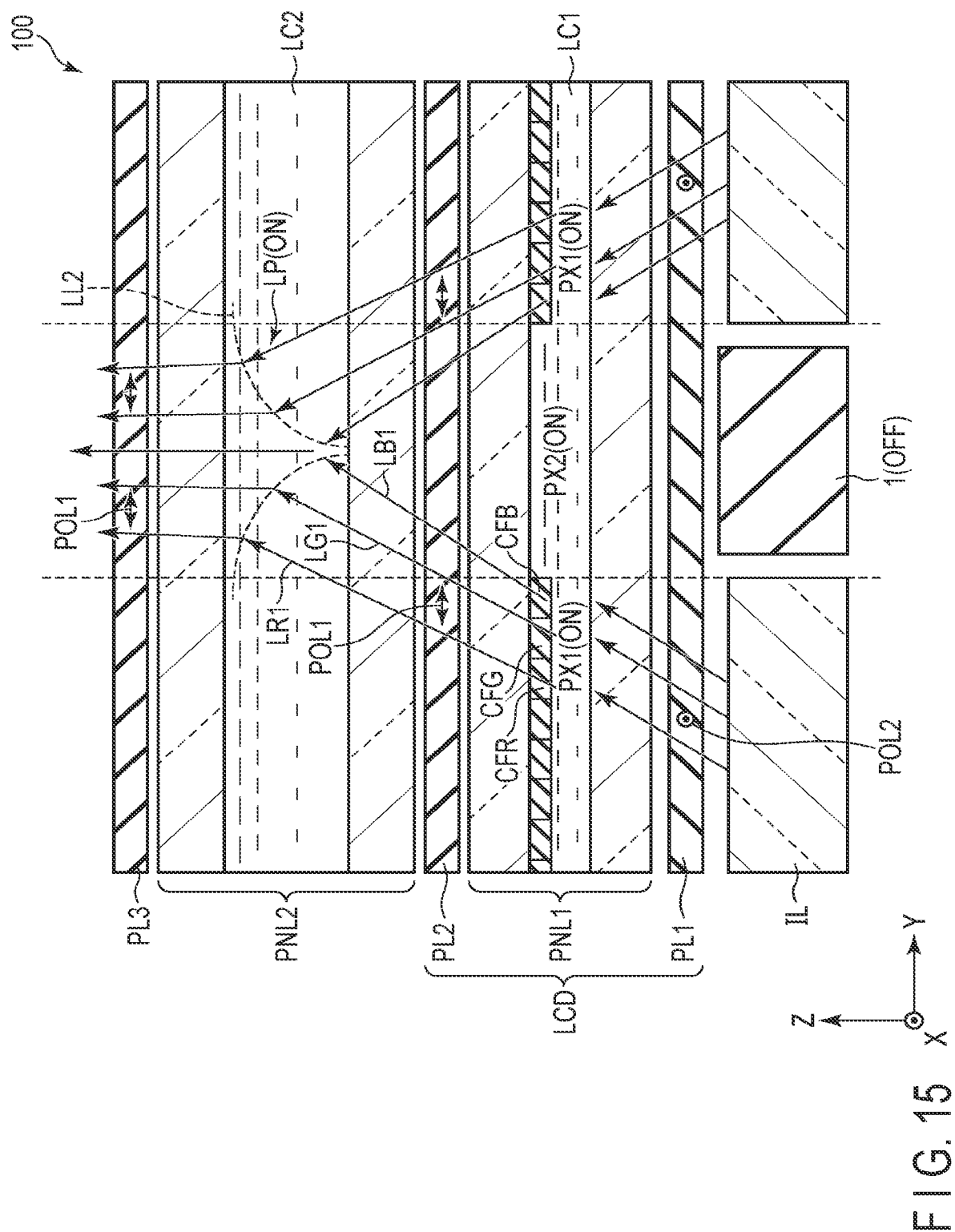
FIG. 15 is an illustration for explaining the fourth operation example.

FIG. 15 is an illustration for explaining the fourth operation example. Both the first pixel PX1 and the second pixel PX2 in the first liquid crystal panel PNL1 are in the on state. The lens portion LP in the second liquid crystal panel PNL2 the on state, and the lens LL2 is formed in the second liquid crystal layer LC2 as described with reference to FIG. 10.

The liquid crystal element LCD forms the light-transmitting state where the liquid crystal element LCD transmits the illumination light from the illumination device IL in the first pixel PX1 in the on state. That is, red light LR1 transmitted through the red color filter CFR, green light LG1 transmitted through the green color filter CFG, and blue light LB1 transmitted through the blue color filter CFB each are transmitted through the second polarizer PL2 as the first linearly polarized light POL1, and forms display light. In addition, the liquid crystal element LCD forms the light-transmitting state in the second pixel PX2 in the on state. Therefore, the illumination light guided to the second pixel PX2 is transmitted through the second polarizer PL2 as the first linearly polarized light POL1.

In the lens portion LP, the display light (LR1, LG1, LB1) transmitted through the second polarizer PL2 is refracted toward directly above the camera 1 by the lens LL2, and is transmitted through the third polarizer PL3. That is, in an area overlapping the camera 1, the display light (LR1, LG1, LB1) from the first pixel PX1 around the camera 1 is emitted. Accordingly, the visibility of the camera 1 in the camera off state can be reduced. In addition, an image can be displayed in the display portion DA including the area overlapping the camera 1, and an image loss can be suppressed.

In the first liquid crystal panel PNL1, when both the first pixel PX1 and the second pixel PX2 are in the off state, that is, when black is displayed in the display portion DA, the camera 1 hardly visible.

Figure 16:
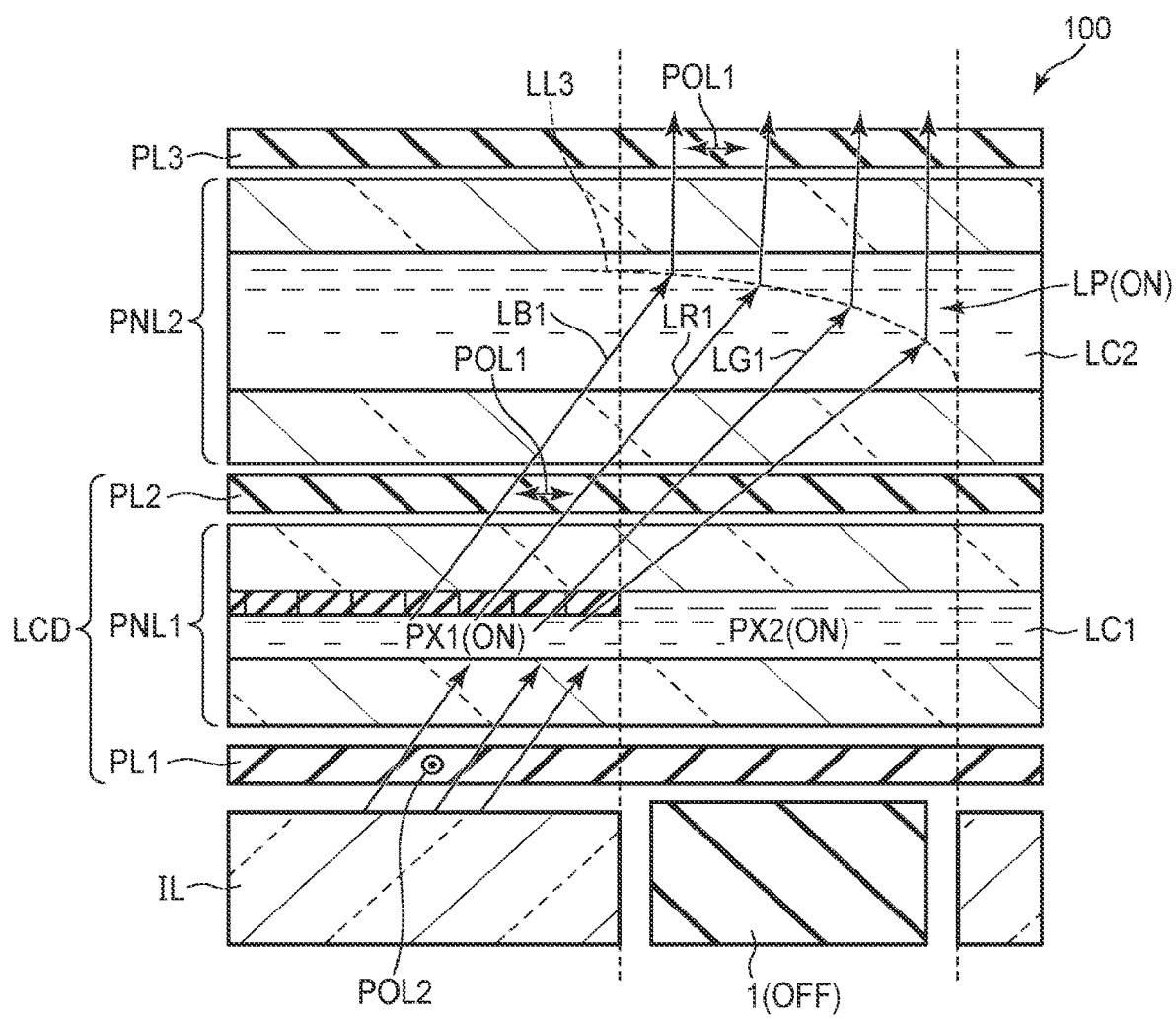
FIG. 16 is an illustration for explaining the fifth operation example.

FIG. 16 is an illustration for explaining the fifth operation example. Both the first pixel PX1 and the second pixel PX2 in the first liquid crystal panel PNL1 are in the on state. The lens portion LP in the second liquid crystal panel PNL2 is in the on state, and the lens LL3 is formed in the second liquid crystal layer LC2 as described with reference to FIG. 11.

Also in the fifth operation example, as in the fourth operation example, the liquid crystal element LCD emits the red light LR1, the green light LG1 and the blue light LB1 as display light from the first pixel PX1 around the camera 1. The display light (LR1, LG1, LG1) is refracted toward directly above the camera 1 by the lens LL3, and is transmitted through the third polarizer PL3 in the lens portion LP. Accordingly, the visibility of the camera 1 in the camera off state can be reduced. In addition, an image loss can be suppressed in the display portion DA.

«Narrowing of Frame»

FIG. 17 is a cross-sectional view showing a configuration example of the second liquid crystal panel PNL2 shown in FIG. 8. Here focuses on the cross-sectional structure including the even-numbered wiring lines W12, W14, W16 and W18. The cross-sectional structure of the odd-numbered wiring lines is the same as the illustrated configuration example.

The wiring lines W12, W14, W16 and W18 are disposed overlapping the non-display portion NDA of the first liquid crystal panel PNL1. At least part of the wiring lines W12, W14, W16 and W18 may overlap the sealant SE1. The second transparent electrode TE2 overlaps the wiring lines W12, W14, W16 and W18. The second liquid crystal layer LC2 is disposed between the wiring lines W12, W14, W16 and W18 and the second transparent electrode TE2. In the second liquid crystal panel PNL2, the illustrations of the alignment film AL3 covering the wiring lines W12, W14, W16 and W18 and the alignment film AL4 covering the second transparent electrode TE2 are omitted.

As for the wiring lines W12, W14, W16 and W18, a higher voltage is applied as the distance from the display portion DA increases (or as the distance to the sealant SE2 decreases). That is, the voltage applied to the wiring line W12 is lower than the voltage applied to the wiring line W18. In one example, a voltage of 1 V is applied to the wiring line W12, a voltage of 2 V is applied to the wiring line W14, a voltage of 3 V is applied to the wiring line W16, and a voltage of 4 V is applied to the wiring line W18. On the other hand, a voltage of, for example, 0 V is applied to the second transparent electrode TE2. The illustrated lens LL4 is formed by the refractive index distribution, the retardation distribution or the phase distribution of the second liquid crystal layer LC2.

The illustrated lens LL4 exerts an effect of refracting display light (LR2, LG2, LB2) transmitted through the display portion DA toward directly above the non-display portion NDA. That is, in an area overlapping the sealant SE1, the display light (LR2, LG2, LB2) from the first pixel PX1 close to the sealant SE1 is emitted. Accordingly, when the electronic apparatus 100 is observed from the third polarizer PL3 side, the frame width of the non-display portion NDA is visually recognized as smaller.

In addition, the wiring lines W12, W14, W16 and W18 are electrically connected to the first transparent electrodes TE12, TE14, TE16 and TE18 as described with reference to FIG. 6. In addition, the applied voltages of the wiring lines W12, W14, W16 and W18 match the applied voltages of the first transparent electrodes TE12, TE14, TE16 and TE18. Therefore, while the lens LL3 is formed in the lens portion LP, the lens LL4 can be formed directly above the wiring lines W12, W14, W16 and W18 simultaneously.

As described above, according to the present embodiment, an electronic apparatus capable of expanding a display portion can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a display panel;
a liquid crystal panel overlapping the display panel;

a camera overlapping the display panel and the liquid crystal panel, and receiving light via the display panel and the liquid crystal panel, wherein the display panel comprises:
- a first pixel electrode not overlapping the camera; and
- a second pixel electrode overlapping the camera;

the liquid crystal panel comprises:
- a plurality of first transparent electrodes overlapping the camera;
- a second transparent electrode overlapping the first transparent electrodes; and
- a liquid crystal layer disposed between the first transparent electrodes and the second transparent electrode; and the liquid crystal layer has a thickness of greater than or equal to 30 µm but less than or equal to 150 µm.

2. The electronic apparatus of claim 1, further comprising:
a first polarizer; and
a second polarizer; wherein
the liquid crystal panel is disposed between the first polarizer and the second polarizer, and
a transmission axis of the first polarizer and a transmission axis of the second polarizer are parallel to each other.

3. The electronic apparatus of claim 1, wherein the first transparent electrodes are formed in a strip shape.

4. The electronic apparatus of claim 1, wherein the first transparent electrodes are formed in a ring shape.

5. The electronic apparatus of claim 1, further comprising:
a plurality of light sources arranged in a first direction, wherein
the first transparent electrodes are formed in a strip shape along the first direction, and are arranged in a second direction intersecting the first direction.

6. The electronic apparatus of claim 1, wherein
the liquid crystal panel further comprises a wiring line electrically connected to each of the first transparent electrodes,
a first part of the wiring line overlapping a display portion is formed of a transparent conductive material, and
a second part of the wiring line overlapping a non-display portion outside the display portion is formed of a metal material.

7. The electronic apparatus of claim 6, wherein
the second transparent electrode overlaps the wiring line in the non-display portion, and
the liquid crystal panel is configured to form a lens based on a potential difference between the wiring line and the second transparent electrode in the liquid crystal layer.

8. The electronic apparatus of claim 1, further comprising a driver, wherein
the driver applies voltages to the first transparent electrodes and the second transparent electrode such that a lens end of a lens formed in the liquid crystal layer overlaps the camera.

* * * * *